US011034826B2

(12) United States Patent
Kanamaru et al.

(10) Patent No.: US 11,034,826 B2
(45) Date of Patent: Jun. 15, 2021

(54) POLYPROPYLENE-BASED RESIN COMPOSITION, PELLET, AND MOLDED OBJECT

(71) Applicant: IDEMITSU KOSAN CO., LTD., Chiyoda-ku (JP)

(72) Inventors: Masami Kanamaru, Chiba (JP); Nozomu Fujii, Sumida-ku (JP); Yutaka Minami, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/605,554

(22) PCT Filed: Apr. 9, 2018

(86) PCT No.: PCT/JP2018/014884
§ 371 (c)(1),
(2) Date: Oct. 16, 2019

(87) PCT Pub. No.: WO2018/193894
PCT Pub. Date: Oct. 25, 2018

(65) Prior Publication Data
US 2020/0123360 A1    Apr. 23, 2020

(30) Foreign Application Priority Data

Apr. 20, 2017 (JP) .............................. JP2017-083873
Dec. 28, 2017 (JP) .............................. JP2017-253421

(51) Int. Cl.
| C08L 23/08 | (2006.01) |
| C08L 23/12 | (2006.01) |
| C08L 23/14 | (2006.01) |
| C08L 91/00 | (2006.01) |
| C08L 99/00 | (2006.01) |

(52) U.S. Cl.
CPC ........... *C08L 23/12* (2013.01); *C08L 23/0815* (2013.01); *C08L 23/14* (2013.01); *C08L 91/00* (2013.01); *C08L 99/00* (2013.01); *C08L 2205/035* (2013.01)

(58) Field of Classification Search
CPC .......... C08F 10/06; C08L 91/00; C08L 99/00; C08L 23/0815; C08L 23/10; C08L 23/14; C08L 23/142; C08L 23/16; C08L 23/12; C08L 2205/02; C08L 2205/025; C09J 123/12; C09J 123/10
See application file for complete search history.

(56) References Cited

U.S. PATENT DOCUMENTS

| 2005/0043495 | A1 | 2/2005 | Minami et al. | |
| 2010/0190405 | A1 | 7/2010 | Takebe et al. | |
| 2013/0225752 | A1* | 8/2013 | Tse | C09J 123/10 524/505 |
| 2015/0299527 | A1* | 10/2015 | Hashima | C08L 23/12 524/528 |
| 2016/0237268 | A1* | 8/2016 | Fuju | B29C 55/16 |
| 2018/0312677 | A1* | 11/2018 | Fuju | C08L 23/10 |

FOREIGN PATENT DOCUMENTS

| JP | 0665553 A | * | 3/1994 |
| JP | 2000-281723 A | | 10/2000 |
| JP | 2002-80658 A | | 3/2002 |
| JP | 2005-232326 A | | 9/2005 |
| JP | 2009-62667 A | | 3/2009 |
| JP | 2015-183135 A | | 10/2015 |
| JP | 2016-151014 A | | 8/2016 |
| WO | WO2015064653 A1 | * | 5/2014 |
| WO | WO2014/129301 A1 | | 8/2014 |
| WO | WO2014/192767 A1 | | 12/2014 |
| WO | WO2017077890 A1 | * | 5/2017 |

OTHER PUBLICATIONS

International Search Report dated Jun. 12, 2018 in PCT/JP2018/014884 filed on Apr. 9, 2018.

* cited by examiner

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

A polypropylene-based resin composition containing a polypropylene-based resin (A) which has a melting endotherm (ΔH-D) of 0 J/g or more and 40 J/g or less and which does not exhibit an observable melting point (Tm-D) or has a melting point (Tm-D) of 0° C. or higher and lower than 90° C., and a polypropylene-based resin (B) which has a melting endotherm (ΔH-D) of more than 40 J/g and 125 J/g or less.

19 Claims, No Drawings

POLYPROPYLENE-BASED RESIN COMPOSITION, PELLET, AND MOLDED OBJECT

TECHNICAL FIELD

The present invention relates to a polypropylene-based resin composition, pellets containing the polypropylene-based resin composition, and a molded article formed from the polypropylene-based resin composition.

BACKGROUND ART

A polyolefin-based resin composition is inexpensive and excellent in various physical properties such as strength, and therefore, is used for various products such as hot-melt adhesives and elastic nonwoven fabrics.

With respect to a hot-melt adhesive using a polyolefin-based resin as a base polymer, it is performed to adjust the formulation with oil, petroleum resin or wax for the purpose of adjusting the open time or set time. In addition, the performance of a hot-melt adhesive greatly depends on the physical properties of the base polymer therein, and therefore, in particular, by controlling the crystallinity of the base polymer, a hot-melt adhesive is adjusted so as to be applicable to various uses.

For example, for the purpose of providing a hot-melt adhesive excellent in thermal creep resistance, PTL 1 discloses a hot-melt adhesive containing an ethylene-based polymer as a base polymer and containing a propylene-based polymer satisfying a specific tensile modulus and a specific breaking elongation as a modifier. PTL 2 discloses a base polymer for hot-melt adhesive having a high fluidity in a melt state, exhibiting a high adhesion strength with respect to adhesion between PP nonwoven fabrics, and further exhibiting a high adhesion strength with respect to adhesion between a PE film and a PP nonwoven fabric. PTL 3 discloses, for the purpose of providing a hot-melt adhesive satisfying both a solidification speed and adhesiveness, a base polymer satisfying both a specific tensile modulus and a specific semi-crystallization time as a base polymer for the hot-melt adhesive.

For use for elastic nonwoven fabrics, PTL 4 discloses, for the purpose of providing an elastic nonwoven fabric having excellent elasticity recovery performance and having a pleasant feel with no stickiness, an elastic nonwoven fabric formed from a crystalline resin composition containing a low-crystalline polypropylene and high-crystalline polypropylene.

CITATION LIST

Patent Literature

PTL 1: WO2014/129301
PTL 2: JP 2015-183135 A
PTL 3: WO2014/192767
PTL 4: JP 2009-062667 A

SUMMARY OF INVENTION

Technical Problem

With respect to the hot-melt adhesives described in PTLs 1 and 2, by changing the base polymer of a polyolefin in accordance with the intended use, the performance of the hot-melt adhesive is adjusted. Consequently, a technique capable of controlling the performance of a hot-melt adhesive, especially the solidification speed or the heat resistance thereof in a more simplified way is desired.

The components excellent in flexibility contained in the resin compositions described in PTLs 3 and 4 are insufficient in granulability.

A problem that the invention is to solve is to provide a polypropylene-based resin composition which is adjustable in a solidification speed and a heat resistance, and a molded article formed from the polypropylene-based resin composition. Another problem is to provide pellets excellent in flexibility and granulability.

Solution to Problem

The disclosure of the present application relates to a polypropylene-based resin composition, pellets and a molded article described below.

<1> A polypropylene-based resin composition containing a polypropylene-based resin (A) which has a melting endotherm (ΔH-D) of 0 J/g or more and 40 J/g or less and which does not exhibit an observable melting point (Tm-D) or has a melting point (Tm-D) of 0° C. or higher and lower than 90° C., and a polypropylene-based resin (B) which has a melting endotherm (ΔH-D) of more than 40 J/g and 125 J/g or less.

<2> The polypropylene-based resin composition according to the above <1>, containing the polypropylene-based resin (A) in an amount of 70% by mass or more and 99.5% by mass or less and the polypropylene-based resin (B) in an amount of 0.5% by mass or more and 30% by mass or less.

<3> The polypropylene-based resin composition according to the above <1> or <2>, wherein the meso triad fraction [mm] of the polypropylene-based resin (A) is 20 mol % or more and 80 mol % or less.

<4> The polypropylene-based resin composition according to any one of the above <1> to <3>, wherein the meso pentad fraction [mmmm] of the polypropylene-based resin (A) is 1 mol % or more and 55 mol % or less.

<5> The polypropylene-based resin composition according to any one of the above <1> to <4>, wherein the limiting viscosity [η] of the polypropylene-based resin (A) is 0.01 dL/g or more and 2.5 dL/g or less.

<6> The polypropylene-based resin composition according to any one of the above <1> to <5>, wherein the polypropylene-based resin (A) contains at least one structural unit selected from the group consisting of ethylene and an α-olefin having 4 to 30 carbon atoms, in an amount of more than 0 mol % and 20 mol % or less.

<7> The polypropylene-based resin composition according to any one of the above <1> to <6>, wherein the melting point (Tm-D) of the polypropylene-based resin (B) is 90° C. or higher and 180° C. or lower.

<8> The polypropylene-based resin composition according to any one of the above <1> to <7>, wherein the meso triad fraction [mm] of the polypropylene-based resin (B) is 70 mol % or more and 99.5 mol % or less.

<9> The polypropylene-based resin composition according to any one of the above <1> to <8>, wherein the meso pentad fraction [mmmm] of the polypropylene-based resin (B) is 55 mol % or more and 99.5 mol % or less.

<10> The polypropylene-based resin composition according to any one of the above <1> to <9>, wherein the limiting viscosity [η] of the polypropylene-based resin (B) is 0.01 dL/g or more and 2.5 dL/g or less.

<11> The polypropylene-based resin composition according to any one of the above <1> to <10>, wherein the polypropylene-based resin (B) contains at least one structural unit selected from the group consisting of ethylene and an α-olefin having 4 to 30 carbon atoms, in an amount of more than 0 mol % and 15 mol % or less.

<12> The polypropylene-based resin composition according to any one of the above <1> to <11>, wherein the Mw of the polypropylene-based resin (B) is 500,000 or less.

<13> The polypropylene-based resin composition according to any one of the above <1> to <12>, wherein the acid value of the polypropylene-based resin (A) and/or the polypropylene-based resin (B) is 10 mgKOH/g or more and 250 mgKOH/g or less.

<14> The polypropylene-based resin composition according to any one of the above <1> to <13>, satisfying the following formula (F):

$$80 \leq mmA \times rA + mmB^2 \times Rb \leq 1400 \quad (F)$$

wherein mmA represents a meso triad fraction [mm] (unit: mol %) of the polypropylene-based resin (A), rA represents a mass ratio of the polypropylene-based resin (A) relative to the total mass of the polypropylene-based resin (A) and the polypropylene-based resin (B), mmB represents a meso triad fraction [mm] (unit: mol %) of the polypropylene-based resin (B), rB represents a mass ratio of the polypropylene-based resin (B) relative to the total mass of the polypropylene-based resin (A) and the polypropylene-based resin (B).

<15> The polypropylene-based resin composition according to any one of the above <1> to <14>, further containing a petroleum resin (C).

<16> The polypropylene-based resin composition according to any one of the above <1> to <15>, further containing an oil (D).

<17> The polypropylene-based resin composition according to the above <16>, wherein the kinetic viscosity at 40° C. of the oil (D) is 5 cSt or more and 800 cSt or less.

<18> The polypropylene-based resin composition according to the above <16> or <17>, wherein the oil (D) is at least one selected from the group consisting of a mineral oil-based hydrocarbon, a paraffin-based process oil, and a naphthene-based process oil.

<19> The polypropylene-based resin composition according to any one of the above <1> to <18>, having a semi-crystallization time of 30 minutes or less.

<20> The polypropylene-based resin composition according to any one of the above <1> to <19>, having a melting endotherm (ΔH-D) of 1 J/g or more and 60 J/g or less.

<21> The polypropylene-based resin composition according to any one of the above <1> to <20>, having a molecular weight distribution (Mw/Mn) of 1.5 or more and 4.0 or less.

<22> The polypropylene-based resin composition according to any one of the above <1> to <21>, having an acid value of 5 mgKOH/g or more and 250 mgKOH/g or less.

<23> Pellets containing a polypropylene-based resin composition of any one of the above <1> to <22>.

<24> A molded article, which is formed from a polypropylene-based resin composition of any one of the above <1> to <22>.

Advantageous Effects of Invention

According to the present invention, there can be provided a polypropylene-based resin composition which is adjustable in a solidification speed and a heat resistance, and a molded article formed from the polypropylene-based resin composition. In addition, there can also be provided pellets containing the polypropylene-based resin composition excellent in flexibility and granulability.

Description of Embodiments

The present invention is described hereinunder. In this description, the numerical range expressed by the wording "a number A to another number B" means a range of "A or more and B or less" (in the case of A<B), or a range of "A or less and B or more" (in the case of A>B). Also in this description, a combination of preferred embodiments is a more preferred embodiment.

[Polypropylene-based Resin Composition]

The polypropylene-based resin composition of the present invention contains a polypropylene-based resin (A) which has a melting endotherm (ΔH-D) of 0 J/g or more and 40 J/g or less and which does not exhibit an observable melting point (Tm-D) or has a melting point (Tm-D) of 0° C. or higher and lower than 90° C., and a polypropylene-based resin (B) which has a melting endotherm (ΔH-D) of more than 40 J/g and 125 J/g or less.

<Polypropylene-Based Resin (A)>

The polypropylene-based resin (A) for use in the present invention is at least one selected from a propylene homopolymer and a copolymer of propylene and any other olefin. The content of the structural unit of propylene in the polypropylene-based resin (A) is, from the viewpoint of securing the strength of the resin, preferably 80 mol % or more, more preferably 81.5 mol % or more, even more preferably 85 mol % or more, and further more preferably 90 mol % or more.

The kind of the polypropylene-based resin (A) is preferably a propylene-based polymer selected from a propylene homopolymer, a propylene-ethylene block copolymer, a propylene-butene block copolymer, a propylene-α-olefin block copolymer, a propylene-ethylene random copolymer, a propylene-butene random copolymer, a propylene-α-olefin random copolymer, or a propylene-α-olefin graft copolymer, more preferably a propylene homopolymer or a propylene-ethylene random copolymer, and even more preferably a propylene homopolymer.

In the case where the polypropylene-based resin (A) is a copolymer, the other olefin than propylene that can be contained therein as a structural unit includes at least one selected from ethylene and an α-olefin having 4 to 30 carbon atoms. The α-olefin having 4 to 30 carbon atoms is preferably an α-olefin having 4 to 24 carbon atoms, more preferably an α-olefin having 4 to 12 carbon atoms, even more preferably an α-olefin having 4 to 8 carbon atoms. Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene and 1-eicosene.

In the case where the polypropylene-based resin (A) is a copolymer, the content of at least one structural unit selected from the group consisting of ethylene and an α-olefin having 4 to 30 carbon atoms is, from the viewpoint of improving low-temperature characteristics, preferably more than 0 mol %, more preferably 0.5 mol % or more, even more preferably 1.0 mol % or more, and is, from the viewpoint of securing the strength of the resin, preferably 20 mol % or less, more preferably 18.5 mol % or less, even more preferably 15.0 mol % or less, and still more preferably 10.0 mol % or less.

(Melting Endotherm (ΔH-D))

The melting endotherm (ΔH-D) of the polypropylene-based resin (A) is 0 J/g or more, preferably 2 J/g or more, more preferably 3 J/g or more, even more preferably 5 J/g or more, and is 40 J/g or less, preferably 38 J/g or less, more preferably 37 J/g or less. Falling within the range, the polypropylene-based resin composition of the present invention can be kept flexible, with stickiness being suppressed. In addition, the balance of flexibility and strength of the pellets containing the polypropylene-based resin composition can be kept good.

In the present invention, the melting endotherm (4WD) is determined by calculating the area surrounded by a line portion that contains a peak of the melting endothermic curve obtained with a differential scanning calorimeter (DSC) by keeping 10 mg of a sample at −10° C. in a nitrogen atmosphere for 5 minutes followed by heating it at 10° C./min, and a line (baseline) drawn by connecting a point on a low-temperature side where no change of the quantity of heat is present with a point on a high-temperature side where no change of the quantity of heat is present.

(Melting Point (Tm-D))

The polypropylene-based resin (A) does not exhibit an observable melting point (Tm-D) or has a melting point (Tm-D) of 0° C. or higher and lower than 90° C. The melting point of the resin having such a melting point is more preferably 30° C. or higher, even more preferably 35° C. or higher, still more preferably 40° C. or higher, and is preferably 85° C. or lower, more preferably 80° C. or lower, even more preferably 50° C. or lower. Falling within the range, the polypropylene-based resin composition of the present invention can be kept flexible, with stickiness being suppressed. In addition, the balance of flexibility and strength of the pellets containing the polypropylene-based resin composition can be kept good.

In the present invention, the peak top of a peak observed on the highest temperature side in a melting endothermic curve obtained with a differential scanning calorimeter (manufactured by PerkinElmer Co., Ltd., DSC-7) by keeping 10 mg of a sample in a nitrogen atmosphere at −10° C. for 5 minutes and then heating the sample at 10° C./min is defined as the melting point (Tm-D).

(Meso Pentad Fraction [mmmm])

The meso pentad fraction [mmmm] is an index of indicating the stereoregularity of a propylene-based polymer, and with increase in the meso pentad fraction [mmmm] thereof, the stereoregularity of the polymer increases. The meso pentad fraction [mmmm] of the polypropylene-based resin (A) is preferably 1 mol % or more, more preferably 10 mol % or more, even more preferably 15 mol % or more, still more preferably 25 mol % or more, and is preferably 55 mol % or less, more preferably 52 mol % or less, even more preferably 50 mol % or less, and still more preferably 49 mol % or less. Falling within the range, the polypropylene-based resin composition of the present invention can be kept flexible, with stickiness being suppressed. In addition, the balance of flexibility and strength of the pellets containing the polypropylene-based resin composition can be kept good.

([rrrr]/(100−[mmmm]))

The value of [rrrr]/(100−[mmmm]) can be obtained from the meso pentad fraction [mmmm] and the racemic pentad fraction [rrrr], and is an index of indicating regularity distribution evenness of a propylene-based polymer. One having a large value of [rrrr]/(100−[mmmm]) is a mixture of a high-stereoregularity polypropylene and an atactic polypropylene such as a conventional polypropylene produced using an already-existing catalyst system. When the value of [rrrr]/(100−[mmmm]) falls within the above range, stickiness can be more suppressed. The unit of meso pentad fraction [mmmm] and racemic pentad fraction [rrrr] each is mol %.

The value of [rrrr]/(100−[mmmm]) of the propylene-based polymer (A-1) is, from the viewpoint of stickiness, preferably 0.15 or less, more preferably 0.1 or less, even more preferably 0.05 or less, still more preferably 0.04 or less. The lower limit is, though not specifically limited thereto, preferably 0.001 or more, more preferably 0.01 or more.

Here, the meso pentad fraction [mmmm] and the racemic pentad fraction [rrrr] are determined in accordance with the method proposed in "Macromolecules, 6, 925 (1973)" by A. Zambelli et al., and are a meso fraction and a racemic fraction in a pentad unit in a polypropylene molecular chain measured with the signal of a methyl group in the $^{13}$C-NMR spectrum thereof. The meso triad fraction [mm], the racemic triad fraction [rr] and the meso racemic triad fraction [mr] described later are a meso fraction, a racemic fraction and a meso racemic fraction in a triad unit in a polypropylene molecular chain, and these triad fractions are also calculated according to the above-mentioned method.

(Meso Triad Fraction [mm])

The meso triad fraction [mm] is a stereoregularity index of indicating the isotacticity of a propylene-based polymer. The meso triad fraction [mm] of the polypropylene-based resin (A) is preferably 20 mol % or more, more preferably 30 mol % or more, even more preferably 40 mol % or more, still more preferably 50 mol % or more, and is preferably 80 mol % or less, more preferably 76 mol % or less, even more preferably 72 mol % or less, and further more preferably 70 mol % or less. Falling within the range, the polypropylene-based resin composition of the present invention can be kept flexible, with stickiness being suppressed. In addition, the balance of flexibility and strength of the pellets containing the polypropylene-based resin composition can be kept good.

$$([mm] \times [rr]/[mr]^2)$$

The value of $[mm] \times [rr]/[mr]^2$ that is calculated from the meso triad fraction [mm], the racemic triad fraction [rr] and the meso racemic triad fraction [mr] indicates an index of the randomness of a polymer, and when the value is nearer to 1, the randomness of the polymer is higher. The unit of the meso triad fraction [mm], the racemic triad fraction [rr] and the meso racemic triad fraction [mr] each is mol %.

The value of the above-mentioned expression in the polypropylene-based resin (A) is preferably 2.0 or less, more preferably 1.8 or less, even more preferably 1.6 or less. The lower limit is, though not limited thereto, preferably 0.5 or more.

$$([mmmm])/([mmrr]+[rmmr]))$$

The value of [mmmm]/([mmrr]+[rmmr]) that is calculated from the meso pentad fraction [mmmm], the meso meso racemic racemic pentad fraction [mmrr] and the racemic meso meso racemic pentad fraction [rmmr] is a stereoregularity index of a polymer. The unit of the meso pentad fraction [mmmm], the meso meso racemic racemic pentad fraction [mmrr] and the racemic meso meso racemic pentad fraction [rmmr] each is mol %.

The value of the above-mentioned expression in the polypropylene-based resin (A) is preferably 10 or less, more preferably 7 or less, even more preferably 4 or less.

(Acid Value)

In the present invention, an acid-modified olefin-based polymer may also be used as the polypropylene-based resin (A). In this case, the acid value of the acid-modified olefin-based polymer is, from the viewpoint of miscibility and affinity with polar substances, preferably 10 mgKOH/g or more, more preferably 20 mgKOH/g or more, even more preferably 30 mgKOH/g or more, further more preferably 40 mgKOH/g or more, and is, from the viewpoint of miscibility and affinity with apolar materials, preferably 250 mgKOH/g or less, more preferably 200 mgKOH/g or less, even more preferably 180 mgKOH/g or less, and further more preferably 150 mgKOH/g or less.

In the present invention, the acid value is measured based on JIS K2501:2003.

(Limiting Viscosity [η])

The limiting viscosity [η] of the polypropylene-based resin (A), as measured in a tetralin solvent at 135° C., is, from the viewpoint of resin strength, preferably 0.01 dL/g or more, more preferably 0.15 dL/g or more, even more preferably 0.3 dL/g or more, and is, from the viewpoint of moldability (handleability), preferably 2.5 dL/g or less, more preferably 1.5 dL/g or less, even more preferably 1.0 dL/g or less.

The limiting viscosity [η] is calculated using the following equation (Huggins equation), in which the reduced viscosity ($\eta_{SP}/c$) is measured in tetralin at 135° C. using an Ubbelohde viscometer.

$$\eta_{SP}/c=[\eta]+K[\eta]^{2}c$$

$\eta_{SP}/c(dL/g)$: reduced viscosity $[\eta](dL/g)$: limiting viscosity $c(g/dL)$: polymer viscosity $K=0.35$ (Huggins constant)

(Weight-Average Molecular Weight (Mw))

The weight-average molecular weight (Mw) of the polypropylene-based resin (A) is, from the viewpoint of mechanical strength, preferably 10,000 or more, more preferably 20,000 or more, even more preferably 25,000 or more, and is, from the viewpoint of moldability (handleability), preferably 500,000 or less, more preferably 400,000 or less, even more preferably 200,000 or less, further more preferably 100,000 or less.

In the present invention, the weight-average molecular weight (Mw) is a polystyrene-equivalent weight-average molecular weight measured through gel permeation chromatography (GPC).

(Molecular Weight Distribution (Mw/Mn))

The molecular weight distribution (Mw/Mn) of the polypropylene-based resin (A) is, from the viewpoint of mechanical strength, preferably less than 30, more preferably 2.5 or less, even more preferably 2.2 or less, and is preferably 1.2 or more, more preferably 1.5 or more.

In the present invention, the molecular weight distribution (Mw/Mn) is a value calculated from the polystyrene-equivalent weight-average molecular weight Mw and number-average molecular weight Mn measured through gel permeation chromatography (GPC).

(Semi-Crystallization Time)

From the viewpoint of slow crystallization speed, the semi-crystallization time of the polypropylene-based resin (A) is 3 minutes or more, or the resin does not have a crystallization peak in differential scanning colorimetry (DSC). Preferably, the semi-crystallization time is 10 minutes or more, more preferably 20 minutes or more. In the case where the crystallization speed is low like in a case where the semi-crystallization time is more than 60 minutes, any definite crystallization peak could not appear.

In the present invention, the "semi-crystallization time" is measured according to the following measurement method.

[Method for Measurement of Semi-Crystallization Time]

The semi-crystallization time is measured according to the following method, using a differential scanning calorimeter (DSC) (manufactured by Perkin Elmer Co., Ltd., trade name; "DSC-7").

(1) 10 mg of a sample is kept at 25° C. for 5 minutes, then heated up to 220° C. at 320° C./min, kept at the temperature for 5 minutes, then cooled down to 25° C. at 320° C./min, and kept at the temperature for 60 minutes, and the time-dependent change in heat generation in the isothermal crystallization process is determined.

(2) An integrated value of the quantity of heat generation from the start of isothermal crystallization to the finish of crystallization is referred to as 100%, and the time in which the integrated value of the quantity of heat generation from the start of isothermal crystallization reaches 50% is defined as the semi-crystallization time.

(Production Method for Polypropylene-based Resin (A))

The polypropylene-based resin (A) can be produced using a metallocene catalyst described, for example, in WO2003/087172. In particular, using a transition metal compound in which ligands form a crosslinked structure via crosslinking groups is preferred, and above all, a metallocene catalyst to be obtained by combining a transition metal compound having a crosslinked structure via two crosslinking groups and a promoter is preferred.

Specific examples of the catalyst include a polymerization catalyst containing:

(i) a transition metal compound represented by a general formula (I):

wherein M represents a metal element of Groups 3 to 10 of the Periodic Table or a metal element of the lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and these may be the same as or different from each other; X represents a σ-bonding ligand, and when plural X's are present, plural X's may be the same as or different from each other and may be crosslinked with any other X, $E^1$, $E^2$, or Y; Y represents a Lewis base, and when plural Y's are present, plural Y's may be the same as or different from each other and may be crosslinked with any other Y, $E^1$, $E^2$, or X; $A^1$ and $A^2$ each are a divalent crosslinking group, which bonds two ligands, and each represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein R$^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other; q is an integer of 1 to 5 and represents [(the atomic valence of M)-2]; and r represents an integer of 0 to 3, and (ii) at least one component selected from (ii-1) a compound capable of reacting with a transition metal compound of the component (i) or a derivative thereof to form an ionic complex and (ii-2) an aluminoxane.

The transition metal compound of the above component (i) is preferably a
(1,2')(2,1') double-crosslinked transition metal compound, and examples thereof include
(1,2'-dimethylsilylene) (2,1'-dimethylsilylene)-bis(3-trimethylsilylmethylindenyl)-zirconium dichloride,
(1,2'-dimethylsilylene)(2,1'-dimethylsilylene)bis(3-trimethylsilylmethyl-5,6-dimethylindenyl)zirconium dichloride,
(1,2'-dimethylsilylene)(2,1'-dimethylsilylene)bis(3-cyclopentylmethyl-5,6-dimethylindenyl)zirconium dichloride,
(1,2'-dimethylsilylene)(2,1'-dimethylsilylene)bis(3-triethylsilylmethylindenyl)-zirconium dichloride, and
(1,2'-dimethylsilylene)(2,1'-dimethylsilylene)bis(3-cyclopropylmethylindenyl)-zirconium dichloride.

Specific examples of the compound of the above component (ii-1) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethylcliphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butyl ammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methylcliphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoro arsenate, silver perchlorate, silver trifluoroacetate, silver trifluoromethanesulfonate, etc.

The aluminoxane of the component (ii-2) includes known linear aluminoxanes and cyclic aluminoxanes.

In addition, using an organic aluminum compound such as trimethyl aluminum, triethyl aluminum, triisopropyl aluminum, triisobutyl aluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride or the like can be used as combined with the above to produce the olefin-based polymer (A).

The content of the polypropylene-based resin (A) contained in the polypropylene-based resin composition of the present invention is, from the viewpoint of securing flexibility, preferably 70% by mass or more relative to 100% by mass of the polypropylene-based resin composition, more preferably 85% by mass or more, even more preferably 90% by mass or more, still more preferably 93% by mass or more, and is, from the viewpoint of increasing solidification speed, preferably 99.5% by mass or less, more preferably 99% by mass, even more preferably 98.5% by mass, still more preferably 98% by mass or less.

<Polypropylene-Based Resin (B)>

The polypropylene-based resin (B) for use in the present invention is at least one selected from a propylene homopolymer and a copolymer of propylene and any other olefin. The content of the propylene structural unit in the polypropylene-based resin (B) is, from the viewpoint of further improving granulability, preferably 85 mol % or more, more preferably 88 mol % or more, even more preferably 90 mol % or more, and further more preferably 93 mol % or more.

The kind of the polypropylene-based resin (B) is the same as that in the preferred range of the polypropylene-based resin (A). In the case where the polypropylene-based resin (B) is a copolymer, the other olefin than propylene to be contained as the structure unit therein includes at least one selected from the group consisting of ethylene and an α-olefin having 4 to 30 carbon atoms, and for the preferred range thereof, reference may be made to the corresponding description relating to the polypropylene-based resin (A).

In the case where the polypropylene-based resin (B) is a copolymer, the content of at least one structural unit selected from the group consisting of ethylene and an α-olefin having 4 to 30 carbon atoms is, from the viewpoint of reduction in molding temperature, preferably more than 0 mol %, more preferably 0.5 mol % or more, even more preferably 1.0 mol % or more, and is, from the viewpoint of increasing solidification speed, preferably 15 mol % or less, more preferably 12 mol % or less, even more preferably 10 mol % or less, still more preferably 7 mol % or less.

(Melting Endotherm (ΔH-D))

The melting endotherm (ΔH-D) of the polypropylene-based resin (B) is more than 40 J/g and 125 J/g or less. From the viewpoint of increasing solidification speed, it is preferably more than 50 J/g, more preferably more than 55 J/g, even more preferably more than 60 J/g, and is preferably 120 J/g or less, more preferably 100 J/g or less, even more preferably 90 J/g or less.

For the method for measuring the melding endotherm (ΔH-D), reference may be made to the corresponding description relating to the polypropylene-based resin (A).

(Melting Point (Tm-D))

The melting point (Tm-D) of the polypropylene-based resin (B) is, from the viewpoint of increasing solidification speed, preferably 90° C. or higher, more preferably 95° C. or higher, even more preferably 100° C. or higher, further more preferably 110° C. or higher, and is, from the viewpoint of low-temperature moldability, preferably 180° C. or lower, more preferably 175° C. or lower, even more preferably 170° C. or lower, further more preferably 165° C. or lower.

For the method for measuring the melting point (Tm-D), reference may be made to the corresponding description relating to the polypropylene-based resin (A).

(Meso Pentad Fraction [mmmm])

The meso pentad fraction [mmmm] of the polypropylene-based resin (B) is, from the viewpoint of increasing solidification speed, preferably 55 mol % or more, more preferably 56 mol % or more, even more preferably 60 mol % or more, still more preferably 64 mol % or more, and is, from the viewpoint of low-temperature moldability, preferably 99.5 mol % or less, more preferably 98 mol % or less, even more preferably 90 mol % or less, and still more preferably 73 mol % or less.

(Meso Triad Fraction [mm])

The meso triad fraction [mm] of the polypropylene-based resin (B) is, from the viewpoint of increasing solidification speed, preferably 70 mol % or more, more preferably 75 mol % or more, even more preferably 78 mol % or more, still more preferably 80 mol % or more, and is, from the viewpoint of low-temperature moldability, preferably 99.5 mol % or less, more preferably 99 mol % or less, even more preferably 97 mol % or less, and further more preferably 85 mol % or less.

For the method for measuring the meso pentad fraction [mmmm] and the meso triad fraction [mm], reference may be made to the corresponding description relating to the polypropylene-based resin (A).

(Weight-Average Molecular Weight (Mw))

The weight-average molecular weight (Mw) of the polypropylene-based resin (B) is, from the viewpoint of mechanical strength, preferably 10,000 or more, more preferably 20,000 or more, even more preferably 25,000 or more, and is, from the viewpoint of moldability (handleability), preferably 500,000 or less, more preferably 200,000 or less, even more preferably 100,000 or less, still more preferably 60,000 or less.

(Acid Value)

In the present invention, an acid-modified olefin-based polymer may also be used as the polypropylene-based resin (B). In this case, the acid value of the acid-modified olefin-based polymer is, from the viewpoint of miscibility and affinity with polar substances, preferably 10 mgKOH/g or more, more preferably 20 mgKOH/g or more, even more preferably 30 mgKOH/g or more, further more preferably 40 mgKOH/g or more, and is, from the viewpoint of miscibility and affinity with apolar materials, preferably 250 mgKOH/g or less, more preferably 200 mgKOH/g or less, even more preferably 180 mgKOH/g or less, and further more preferably 150 mgKOH/g or less.

For the method for measuring the acid value, reference may be made to the corresponding description relating to the polypropylene-based resin (A).

(Limiting Viscosity [η])

The limiting viscosity [η] of the polypropylene-based resin (B), as measured in a tetralin solvent at 135° C., is, from the viewpoint of strength, preferably 0.01 dL/g or more, more preferably 0.15 dL/g or more, even more preferably 0.2 dL/g or more, and is, from the viewpoint of moldability (handleability), preferably 2.5 dL/g or less, more preferably 1.5 dL/g or less, even more preferably 0.8 dL/g or less.

For the method for measuring the limiting viscosity [η], reference may be made to the corresponding description relating to the polypropylene-based resin (A).

(Melt Flow Rate (MFR) [g/10 min])

The melt flow rate of the polypropylene-based resin (B) is, from the viewpoint of flowability and moldability, preferably 10 g/10 min or more, more preferably 15 g/10 min or more, even more preferably 40 g/10 min or more, and is, from the viewpoint of strength, preferably 2000 g/10 min or less, more preferably 1500 g/10 min or less, even more preferably 1000 g/10 min or less.

In the present invention, MFR of the polypropylene-based resin (B) is measured according to ISO 1133:1997, under the condition of a temperature of 230° C. and a load of 21.18 N.

(Production Method for Polypropylene-Based Resin (B))

The production method for the polypropylene-based resin (B) is not specifically limited, and the resin may be produced according to a known method using a Ziegler catalyst or a metallocene catalyst.

The content of the polypropylene-based resin (B) contained in the polypropylene-based resin composition of the present invention is, from the viewpoint of appropriately suppressing solidification speed, preferably 0.5% by mass or more relative to 100% by mass of the polypropylene-based resin composition, more preferably 1% by mass or more, even more preferably 1.5% by mass or more, still more preferably 2% by mass or more, and is, from the viewpoint of securing flexibility, preferably 30% by mass or less, more preferably 15% by mass or less, even more preferably 10% by mass or less, still more preferably 7% by mass or less.

<Petroleum Resin (C)>

Preferably, the polypropylene-based resin composition of the present invention further contains a petroleum resin (C) from the viewpoint of controlling glass transition point that contributes toward controlling solidification speed. The petroleum resin is one produced by polymerizing mainly C5 and C9 fractions, among the fractions having remained after collection of a necessary fraction through thermal cracking of a petroleum naphtha, without isolating unsaturated hydrocarbons therefrom, with an acid catalyst or under heating, and is one that solidified at room temperature (25° C.).

Examples of the petroleum resin (C) includes an aliphatic petroleum resin, an alicyclic petroleum resin, an aromatic petroleum resin, a copolymer petroleum resin of an aliphatic component and an aromatic component, a copolymer petroleum resin of an alicyclic component and an aromatic component, a copolymer petroleum resin of an alicyclic component and an aliphatic component, and hydrogenated petroleum resins thereof. Above all, hydrogenated petroleum resins are preferred, and a hydrogenated petroleum resin of an aliphatic petroleum resin, a hydrogenated petroleum resin of an aromatic petroleum resin, and a hydrogenated petroleum resin of a copolymer petroleum resin of an alicyclic component and an aromatic component are more preferred.

As the hydrogenated petroleum resin, commercially-available products can be used. Examples of a partially-hydrogenated petroleum resin of a copolymer petroleum resin of an alicyclic component and an aromatic component include "imary S-100 (softening point: 100° C.)" and "imary S-110 (softening point: 110° C.)" both trade names by Idemitsu Kosan Co., Ltd. Examples of a completely hydrogenated petroleum resin of a copolymer petroleum resin of an alicyclic component and an aromatic component include "imary P-90 (softening point: 90° C.)", "imary P-100 (softening point 100° C.)", "imary P-125 (softening point: 125° C.)" and "imary P-140 (softening point: 140° C.)", all by Idemitsu Kosan Co., Ltd. Examples of a completely hydrogenated petroleum resin of an aliphatic petroleum resin include "Eastotac H-130W (softening point: 130° C.)" by Eastman Chemical Japan Corporation, and "Escorez 5300 (softening point: 100° C.)" by Exxon Corporation. Examples of a partially hydrogenated petroleum resin of an aliphatic petroleum resin include "Escorez 5600 (softening point: 100° C.)" by Exxon Corporation. Examples of a partially hydrogenated petroleum resin of an aromatic petroleum resin include "Alcon M-100 (softening point: 100° C.)" by Arakawa Chemical Co., Ltd. Examples of a completely hydrogenated petroleum resin of an aromatic petroleum resin include "Alcon P-100 (softening point: 100° C.)" by Arakawa Chemical Co., Ltd., and "Alcon P-125 (softening point: 125° C.)" by Arakawa Chemical Co., Ltd.

In the case where the polypropylene-based resin composition of the present invention contains a petroleum resin (C), the content thereof is preferably 10% by mass or more relative to 100% by mass of the polypropylene-based resin (A), more preferably 20% by mass or more, and is preferably 50% by mass or less, more preferably 30% by mass or less.

<Oil (D)>

Preferably, the polypropylene-based resin composition of the present invention further contains an oil (D) from the viewpoint of improving flowability and imparting low-temperature characteristics.

The oil (D) is not specifically limited, and examples thereof include a mineral oil such as a paraffinic process oil, a naphthenic process oil and an isoparaffinic oil; an aromatic, mineral oil-based hydrocarbon; a synthetic resin-based hydrocarbon such as a low-molecular substance such as polybutene, polybutadiene, and poly($\alpha\alpha$-olefin); an aliphatic oil-based softener such as alkylbenzene, castor oil, linseed oil, rape seed oil and coconut oil; and an ester plasticizer such as dibutyl phthalate, dioctyl phthalate, dioctyl adipate, and doctyl sebacate. Above all, preferred is at least one selected from the group consisting of a mineral oil-based hydrocarbon, a paraffinic process oil and a naphthenic process oil.

The weight-average molecular weight of the mineral oil-based hydrocarbon is preferably 50 to 2,000, especially preferably 100 to 1,500; the pour point thereof is preferably −40 to 0° C., more preferably −30 to 0° C.; and the flash point (COC method) thereof is preferably 200 to 400° C., more preferably 250 to The pour point is a value measured according to JIS K2269, and the flash point is a value measured according to JIS K2265.

The kinematic viscosity at 40° C. of the oil (D) is preferably 5 cSt or more and 800 cSt or less, more preferably 10 cSt or more and 500 St or less.

The kinematic viscosity is a value measured according to ISO3104.

In the case where the polypropylene-based resin composition of the present invention contains an oil (D), the content thereof is preferably 5% by mass or more relative to 100% by mass of the polypropylene-based resin (A), more preferably 8% by mass or more, and is preferably 20% by mass or less, more preferably 15% by mass or less.

<Polypropylene-based Resin Composition>

The polypropylene-based resin composition of the present invention may be obtained by blending polypropylene-based resins (A) and (B) and optionally a petroleum resin (C) and/or an oil (D).

The solidification speed of the polypropylene-based resin composition of the present invention is preferably 200 sec or more, more preferably 300 sec or more, even more preferably 400 sec or more, and is preferably 2,000 sec or less, more preferably 1,000 sec or less, even more preferably 600 sec or less. When the solidification speed falls within the range, the open time length can be suitable and the composition can be used in a broad range for hot-melt adhesive and others. The solidification speed can be measured according to the method described in the section of Examples.

The softening point of the polypropylene-based resin composition of the present invention is preferably 90° C. or higher, more preferably 100° C. or higher, even more preferably 115° C. or higher, further more preferably 130° C. or higher, and is preferably 165° C. or lower. The softening point may be measured according to a ring and ball method according to JAI 7-1991.

The viscosity of the polypropylene-based resin composition of the present invention can be measured using a B-type viscometer, and is preferably 30 mPa·s or more at 190° C., more preferably 1,000 mPa·s or more, even more preferably 5,000 mPa·s or more, further more preferably 400,000 mPa·s or more, and is preferably 500,000 mPa·s or less.

(Semi-Crystallization Time)

The semi-crystallization time of the polypropylene-based resin composition is, from the viewpoint of preventing blocking of pellets containing the polypropylene-based resin composition, preferably 30 minutes or less, more preferably 20 minute or less, more preferably 15 minutes or less, even more preferably 10 minutes or less.

For the method for measuring the semi-crystallization time, reference may be made to the corresponding description relating to the polypropylene-based resin (A).

(Melting Endotherm ($\Delta$H-D))

The melting endotherm ($\Delta$H-D) of the polypropylene-based resin composition is, from the viewpoint of preventing blocking of pellets containing the polypropylene-based resin composition, preferably 1 J/g or more, more preferably 3 J/g or more, even more preferably 5 J/g or more, further more preferably 10 J/g or more, and is, from the viewpoint of flexibility, preferably 60 J/g or less, more preferably 55 J/g or less, even more preferably 50 J/g or less, further more preferably 45 J/g or less.

For the method for measuring the melting endotherm ($\Delta$H-D), reference may be made to the corresponding description relating to the polypropylene-based resin (A).

(Meso Pentad Fraction [mmmm])

The meso pentad fraction [mmmm] of the polypropylene-based resin composition is, from the viewpoint of the strength of pellets containing the polypropylene-based resin composition, preferably 1 mol % or more, more preferably 10 mol % or more, even more preferably 20 mol % or more, still more preferably 30 mol % or more, and is, from the viewpoint of flexibility, preferably 60 mol % or less, more preferably 55 mol % or less, even more preferably 50 mol % or less, and still more preferably 45 mol % or less.

(Meso Triad Fraction [mm])

The meso triad fraction [mm] of the polypropylene-based resin composition is, from the viewpoint of the strength of pellets containing the polypropylene-based resin composition, preferably 20 mol % or more, more preferably 30 mol % or more, even more preferably 40 mol % or more, still more preferably 50 mol % or more, and is, from the viewpoint of flexibility preferably 80 mol % or less, more preferably 76 mol % or less, even more preferably 72 mol % or less, and further more preferably 65 mol % or less.

For the method for measuring the meso pentad fraction [mmmm] and the meso triad fraction [mm], reference may be made to the corresponding description relating to the polypropylene-based resin (A).

(Acid Value)

In the present invention, the polypropylene-based resin composition may be an acid-modified polypropylene-based resin composition. In this case, the acid value of the polypropylene-based resin composition is, from the viewpoint of miscibility and affinity with polar substances, preferably 5 mgKOH/g or more, more preferably 10 mgKOH/g or more, even more preferably 20 mgKOH/g or more, further more preferably 40 mgKOH/g or more, and is, from the viewpoint of miscibility and affinity with apolar materials, preferably 250 mgKOH/g or less, more preferably 200 mgKOH/g or less, even more preferably 180 mgKOH/g or less, and further more preferably 150 mgKOH/g or less.

For the method for measuring the acid value, reference may be made to the corresponding description relating to the polypropylene-based resin (A).

(Weight-Average Molecular Weight (Mw))

The weight-average molecular weight (Mw) of the polypropylene-based resin composition is, from the viewpoint of preventing blocking, preferably 10,000 or more, more preferably 20,000 or more, even more preferably 25,000 or more, and is, from the viewpoint of moldability (handleability), preferably 500,000 or less, more preferably 200,000 or less, even more preferably 100,000 or less, further more preferably 60,000 or less.

(Molecular Weight Distribution (Mw/Mn))

The molecular weight distribution (Mw/Mn) of the polypropylene-based resin composition is, from the viewpoint of moldability (handleability), preferably 1.5 or more, more preferably 1.6 or more, even more preferably 1.8 or more, further more preferably 1.9 or more, and is, from the viewpoint of preventing blocking, preferably 4.5 or less, more preferably 4.3 or less, even more preferably 4.0 or less, further more preferably 3.8 or less.

For the method of measuring Mw and Mw/Mn, reference may be made to the corresponding description relating to the polypropylene-based resin (A).

(Formula (F))

The polypropylene-based resin composition of the present invention preferably satisfies the following:

$$80 \leq mmA \times rA + mmB^2 \times rB \leq 1400 \tag{F}$$

wherein mmA represents a meso triad fraction [mm] (unit: mol %) of the polypropylene-based resin (A), rA represents a mass ratio of the polypropylene-based resin (A) relative to the total mass of the polypropylene-based resin (A) and the polypropylene-based resin (B), mmB represents a meso triad fraction [mm] (unit: mol %) of the polypropylene-based resin (B), rB represents a mass ratio of the polypropylene-based resin (B) relative to the total mass of the polypropylene-based resin (A) and the polypropylene-based resin (B).

The present inventors have tried satisfaction both flexibility and granulability of pellets containing the resin composition by varying the content ratio of the polypropylene-based resin (A) and the polypropylene-based resin (B) in the resin composition, and have found different results depending on the kind of resins even though the content ratio thereof is the same. The present inventors have further made assiduous studies and, as a result, have found that when the above-mentioned formula (F) is satisfied, in which the meso triad fraction of the polypropylene-based resin (A), the meso triad fraction of the polypropylene-based resin (B) and the content ratio of the polypropylene-based resin (A) and the polypropylene-based resin (B) in the resin composition are taken into consideration, then pellets satisfying both flexibility and granulability can be obtained.

mmA represents a meso triad fraction [mm] (unit: mol %) of the polypropylene-based resin (A), and mmB represents a meso triad fraction [mm] (unit: mol %) of the polypropylene-based resin (B). Preferred ranges of the meso triad fraction [mm] of the polypropylene-based resin (A) and the polypropylene-based resin (B) are as mentioned hereinabove.

rA represents a mass ratio of the polypropylene-based resin (A) relative to the total mass of the polypropylene-based resin (A) and the polypropylene-based resin (B), and rB represents a mass ratio of the polypropylene-based resin (B) relative to the total mass of the polypropylene-based resin (A) and the polypropylene-based resin (B). Preferred ranges of the content of the polypropylene-based resin (A) and that of the polypropylene-based resin (B) contained in the polypropylene-based resin composition of the present invention are as described above.

The above formula (F) indicates that a total of the value calculated by multiplying the mass ratio of the polypropylene-based resin (A) by the meso triad fraction[mm] of the polypropylene-based resin (A), and the value calculated by multiplying the mass ratio of the polypropylene-based resin (B) by the square of the meso triad fraction [mm] of the polypropylene-based resin (B) is 80 or more and 1400 or less. Satisfying the formula (F), pellets containing the polypropylene-based resin composition of the present invention can satisfying both flexibility and granulability.

The polypropylene-based resin composition of the present invention preferably satisfies the following expression (F1), more preferably the following expression (F2).

$$200 \leq mmA \times rA + mmB^2 \times rB \leq 1200 \tag{F1}$$

$$300 \leq mmA \times rA + mmB^2 \times rB \leq 800 \tag{F2}$$

[Pellets]

Containing the above-mentioned polypropylene-based resin composition, the pellets of the present invention are excellent in flexibility and granulability.

The content of the polypropylene-based resin (A) in the pellets of the present invention is, from the viewpoint of the flexibility of the pellets of the present invention, preferably 70% by mass or more relative to 100% by mass of the pellets, more preferably 85% by mass or more, even more preferably 90% by mass or more, further more preferably 93% by mass or more, and is, from the viewpoint of increasing solidification speed, preferably 99.5% by mass or less, more preferably 99% by mass or less, even more preferably 98.5% by mass or less, further more preferably 98% by mass or less.

The content of the polypropylene-based resin (B) in the pellets of the present invention is, from the viewpoint of improving the granulability of the pellets of the present invention, preferably 0.5% by mass or more relative to 100% by mass of the pellets, more preferably 1% by mass or more, even more preferably 1.5% by mass or more, further more preferably 2% by mass or more, and is, from the viewpoint of securing the flexibility of the pellets, preferably 30% by mass or less, more preferably 15% by mass or less, even more preferably 10% by mass or less, further more preferably 7% by mass or less.

[Molded Article]

The molded article of the present invention is one formed from the above-mentioned polypropylene-based resin composition.

The polypropylene-based resin composition can be molded into molded article having a desired shape according to a known molding method, for example, according to a method of injection molding, extrusion molding, blow molding, inflation molding, compression molding, or vacuum molding.

EXAMPLES

Next, the present invention will be described in more detail with reference to Examples, but the present invention is by no means limited to these Examples.
[DSC Measurement]
(1) Melting Point (Tm-D) and Melting Endotherm (ΔH-D)

Using a differential scanning calorimeter (manufactured by PerkinElmer Co., Ltd., DSC-7), 10 mg of a sample was kept in a nitrogen atmosphere at −10° C. for 5 minutes, and then heated at 10°/min. From the resultant melting endothermic curve, the melting endotherm (ΔH-D) was determined. In addition, from the peak top of the peak observed on the highest temperature side of the resultant melting endothermic curve, the melting point (Tm-D) was determined.

The melting endotherm (ΔH-D) is calculated as follows. A line drawn by connecting a point on the low-temperature side with no heat quantity change and a point on the high-temperature side with no heat quantity change is referred to as a base line, and the area surrounded by the baseline and a line part including peaks of the melting endothermic curve drawn through DSC using a differential scanning calorimeter (DSC-7, manufactured by Perkin Elmer, Inc.) is calculated to determine the melting endotherm.
(2) Semi-Crystallization Time A differential scanning calorimeter (DSC) (manufactured by Perkin Elmer Co., Ltd., trade name; "DSC-7") was used. 10 mg of a sample was kept at 25° C. for 5 minutes, then heated up to 220° C. at 320° C./sec, kept at the temperature for 5 minutes, then cooled down to 25° C. at 320° C./sec, and kept at the temperature for 60 minutes, and the time-dependent change in heat generation in the isothermal crystallization process was determined An integrated value of the quantity of heat generation from the start of isothermal crystallization to the finish of crystallization was referred to as 100%, and the time in which the integrated value of the quantity of heat generation from the start of isothermal crystallization reached 50% was defined as the semi-crystallization time.
[NMR Measurement]

$^{13}$C-NMR spectrometry was carried out using the following device under the following condition. For peak assignment, the method proposed in "Macromolecules, 8, 687 (1975)" by A. Zambelli, et al. was referred to.
Device: $^{13}$C-NMR spectrometer, JNM-EX400 series manufactured by JEOL, Ltd.
  Method: proton complete decoupling method
  Concentration: 220 mg/mL
  Solvent: mixed solvent of 1,2,4-trichlorobenzene and deuterated benzene at 90:10 (volume ratio)
  Temperature: 130° C.
  Pulse width: 45°
  Pulse repetition time: 4 seconds
  Accumulation: 10,000 times
<Calculation Formulae>

$M = m/S \times 100$ $R = \gamma/S \times 100$ $S = P\beta\beta + P\alpha\beta + P\alpha\gamma$ S: signal strength of side-chain methyl carbon atom in all propylene units
  Pββ: 19.8 to 22.5 ppm
  Pαβ: 18.0 to 17.5 ppm
  Pαγ: 17.5 to 17.1 ppm
  γ: racemic pentad chain: 20.7 to 20.3 ppm
  m: meso pentad chain: 21.7 to 22.5 ppm The meso pentad fraction [mmmm], the racemic pentad fraction [rrrr], the meso meso racemic racemic pentad fraction [mmrr] and the racemic meso meso racemic pentad fraction [rmmr] were determined in accordance with the method proposed in "Macromolecules, 6, 925 (1973)" by A. Zambelli et al. and are the meso fraction, the racemic fraction, the meso meso racemic racemic fraction, and the racemic meso meso racemic fraction, respectively, in the pentad unit in the polypropylene molecular chain measured by the signal of the methyl group in $^{13}$C-NMR spectrometry. In addition, the meso triad fraction [mm], the racemic triad fraction [rr] and the meso racemic triad fraction [mr] were also calculated according to the above-mentioned method.
[Measurement of Weight-Average Molecular Weight (Mw) and Molecular Weight Distribution (Mw/Mn)]

The weight-average molecular weight (Mw) and the number-average molecular weight (Mn) were measured through gel permeation chromatography (GPC), and the molecular weight distribution (Mw/Mn) was determined. In the measurement, the following device was used under the following condition, and the polystyrene-equivalent weight-average molecular weight and number-average molecular weight were measured. The molecular weight distribution (Mw/Mn) is calculated from these weight-average molecular weight (Mw) and number-average molecular weight (Mn).
<GPC Measuring Device>
  Column: "TOSO GMHHR-H(S)HT" manufactured by Tosoh Corporation
  Detector: RI detector for liquid chromatography, "Waters 150C" manufactured by Waters Corporation
<Measurement Condition>
  Solvent: 1,2,4-trichlorobenzene
  Measurement temperature: 145° C.
  Flow rate: 1.0 mL/min
  Sample concentration: 2.2 mg/mL
  Injection amount: 160 μL
  Calibration curve: Universal Calibration
  Analysis software: HT-GPC (ver. 1.0)
[Limiting Viscosity [η]]

Using a viscometer (manufactured by Rigo Co., Ltd., trade name: "VMR-053U-PC•F01") with an Ubbelohde-type viscosity tube (bulb volume at measurement time: 2 to 3 mL, capillary diameter: 0.44 to 0.48 mm), and using tetralin as a solvent, a solution of 0.02 to 0.16 g/dL was measured at 135° C.
<Melt Flow Rate (MFR)>

MFR was measured according to ISO 1133:1997, at a temperature of 230° C. and under a load of 21.18 N.
<Acid Value>

Acid value was measured based on JIS K2501:2003.

Production Example 1

Synthesis of (1,2'-dimethylsilylen (2,1'-dimethylsilylene)-bis[3-trimethylsilylmethyl-5,6-dimethylindenyl)zirconium dichloride [transition metal compound (a1) represented by the following formula]]

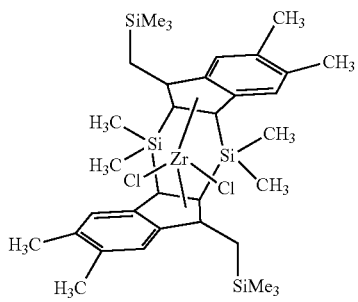

(1-1) Synthesis of 5,6-dimethyl-1-indanone 150 g (1125 mmol) of aluminum chloride and 450 mL of dichloromethane were put into a 500-mL three-neck flask, and then a mixture of 60.3 mL (500 mmol) of o-xylene and 47.7 mL (500 mmol) of 3-chloropropionyl chloride was dropwise added thereto at 25° C. over 1 hour. The reaction mixture was stirred at 25° C. for 3 hours, and the reaction mixture was put into a mixture of 500 g of water with ice and 50 mL of concentrated hydrochloric acid. Next, the reaction mixture was extracted with 500 mL of dichloromethane, then washed with water and brine, dried with anhydrous magnesium sulfate, and then the solvent was evaporated out under reduced pressure to obtain 3-chloro-1-(3,4-dimethylphenyl)-propan-1-one (94.4 g, 480 mmol) (yield 96%).

480 mL of concentrated sulfuric acid was put into a three-neck flask, and 3-chloro-1-(3,4-dimethylphenyl)-propan-1-one (94.4 g, 480 mmol) was dropwise added thereto at 25° C. After stirred at 90° C. or 4 hours, the reaction mixture was cooled, and then put into 1000 g of water with ice. The reaction mixture was extracted with 500 mL of toluene, washed with an aqueous saturated sodium hydrogencarbonate solution, water and brine, and dried with anhydrous magnesium sulfate. Next, this was filtered and the solvent was evaporated away under reduced pressure. The resultant crude product was dissolved in 2500 mL of hexane, filtered, and crystallized at 4° C. to obtain 14.2 g of 5,6-dimethyl-1-indanone (yield 19%). This operation was repeated three times to produce 51.3 g of 5,6-dimethyl-1-indanone.

(1-2) Synthesis of 5,6-dimethylindene 51.3 g (320.1 mmol) of 5,6-dimethyl-1-indanone was dissolved in 400 mL of dewatered methanol, warmed at 35° C. in a water bath, and then 12.1 g (320.1 mmol) of sodium borohydride was added thereto little by little while kept solid. After the addition, this was stirred at 60° C. for 2 hours, cooled down to 25° C., and then hydrolyzed with 700 mL of 5% hydrochloric acid added thereto. Next, the reaction mixture was extracted with 1000 mL of diethyl ether, then processed for liquid-liquid separation, and the organic layer was dried with anhydrous magnesium sulfate, and further the solvent was evaporated away to obtain 51.41 g of 5,6-dimethyl-1-indanol as a beige solid (yield 99%).

The results in measurement through $^1$H-NMR (500 MHz, CDCl$_3$) were: δ 1.91, 2.44, 2.74, 2.98 (m, —CH$_2$CH$_2$—, 4H); 2.26 (s, —CH$_3$, 6H); 5.18 (s, —CH—, 1H), 7.03, 7.18 (s, Ar—H, 2H).

450 mL of toluene was added to 51.41 g of the resultant 5,6-dimethyl-1-indanol, then 3.2 g of p-toluenesulfonic acid pyridinium salt was added thereto, and the mixture was heated under reflux for 2.5 hours, then left cooled, washed with water, the organic layer was dried with anhydrous magnesium sulfate, and toluene was evaporated away to obtain 37.02 g of 5,6-dimethylindene as a brown oil (yield 81%).

The results in measurement through $^1$H-NMR (500 MHz, CDCl$_3$) were: δ 2.30 (s, —CH$_3$, 6H); 3.33 (s, —CH$_2$—, 2H), 6.46, 6.81 (m, —CH—, 2H), 7.19, 7.24 (s, Ar—H, 2H).

(1-3) Synthesis of 5,6-dimethyl-2-bromoindene 200 mL of dimethyl sulfoxide (DMSO) and 9.4 mL of water were added to 37.02 g (256.7 mmol) of 5,6-dimethylindene. 45.8 g of N-bromosuccinimide was added to the mixture little by little while kept solid, and after this was stirred overnight, 200 mL of water was added thereto, and extracted with 500 mL of diethyl ether. The organic layer was dried with anhydrous magnesium sulfate, and diethyl ether was evaporated away to obtain 56.04 g (232.4 mmol) of 5,6-dimethyl-2-bromo-1-indanol as a brown solid (yield 91%).

The results in measurement through $^1$H-NMR (500 MHz, CDCl$_3$) were: δ 2.28 (s, —CH$_3$, 6H); 3.14, 3.49 (m, —CH$_2$CH$_2$—, 4H), 4.24 (m, —CH(Br)—, 1H); 5.25 (m, —CH—, 1H), 6.99, 7.11 (s, Ar—H, 2H).

56.04 g (232.4 mmol) of the resultant 5,6-dimethyl-2-bromo-1-indanol was dissolved in 600 mL of toluene, 4.5 g of p-toluenesulfonic acid was added thereto and heated under reflux, and then, after this was heated for 3 hours, toluene was evaporated away under reduced pressure to obtain a dark brown solid. The solid was recrystallized from hexane to obtain 23.8 g of 5,6-dimethyl-2-bromoindene as a brown powder (yield 46%).

The results in measurement through $^1$H-NMR (500 MHz, CDCl$_3$) were: δ 2.26 (s, —CH$_3$, 6H); 3.52 (s, —CH$_2$—, 2H), 6.83 (s, —CH=, 1H), 7.07, 7.13 (s, Ar—H, 2H).

(1-4) Synthesis of (1,2'-dimethylsilylene)(2,1'-dimethylsilylene)-bis(5,6-climehtylindene)

5.3 g of magnesium flakes suspended in 100 mL of THF was activated with 0.1 mL of 1,2-dibromoethane. A solution of 100 mL THF with 23.8 g (106.8 mmol) of 5,6-dimethyl-2-bromoindene was gradually added thereto, stirred at 25° C. for 2 hours, and then 6.4 mL (53.4 mmol) of clichloroclimethylsilane was added thereto at 0° C. Further this was stirred at 25° C. for 4 hours, and THF was evaporated away under reduced pressure. Next, the reaction mixture was extracted four times using 150 mL of hexane, and the solvent was evaporated away to obtain 18.4 g of dimethylbis(5,6-dimethylinden-2-yl)silane as a white solid.

The results in measurement through $^1$H-NMR (500 MHz, CDCl$_3$) were: δ 0.44 (s, Si—CH$_3$, 6H): 2.32 (s, —CH$_3$, 12H); 3.41 (m, —CH$_2$—, 4H); 7.21, 7.24, 7.30 (m, —CH=, Ar—H, 6H).

120 mL of diethyl ether was added to 18.4 g (53.4 mmol) of the resultant dimethylbis(5,6-dimethylinden-2-yl)silane, then 42.2 mL of a hexane solution of n-butyl lithium (2.66 M) was dropwise added thereto at −20° C., stirred at 25° C. for 2 hours, and then left as such statically. The supernatant was separated through filtration, and the precipitate was dried under reduced pressure. 150 mL of THF was added thereto to be a uniform yellowish brown solution. At 0° C., 6.4 mL (53.4 mmol) of dichlorodimethylsilane was added and stirred at 55° C. for 6 hours. The formed white solid was separated through filtration, and dried under reduced pressure to obtain 15.6 g of (1,2'-dimehtylsilylene)(2,1'-dimethylsilylene)bis(5,6-dimethylindene) (yield 73%).

The results in measurement through $^1$H-NMR (500 MHz, CDCl$_3$) were: δ −0.71, 0.67 (s, Si—CH$_3$, 12H); 2.31 (s, —CH$_3$, 12H); 3.53 (2, —CH—, 2H); 7.18, 7.24, 7.27 (s, —CH=, Ar—H, 6H).

(1-5) Synthesis of (1,2'-dimethylsilylene) (2,1'-dimethylsilylene)-bis(3-trimethylsilylmethyl-5,6-dimethylindenyl)zirconium dichloride 3.34 g (8.3 mmol) of (1,2'-dimehtylsilylene) (2,1'-dimethylsilylene)bis(5,6-dimethylindene) was suspended in 50 mL of diethyl ether, 6.6 mL of n-butyl lithium (2.65 M) was dropwise added thereto at −78° C., and then this was heated up to 25° C., stirred for 5 hours, and the formed yellowish white precipitate was separated through filtration, dried, and dissolved in 50 mL of THF. At −78° C., 2.6 mL (17.4 mmol) of methyltrimethylsilane iodide was dropwise added, stirred at 25° C. for 4 hours, and then hydrolyzed with 50 mL of water added thereto. The reaction mixture was extracted with 100 mL of diethyl ether, processed for liquid-liquid separation, dried with anhydrous magnesium sulfate, and then the solvent was evaporated away to obtain 4.71 g of a pale yellow solid. The solid was dissolved in 50 mL of diethyl ether, 6.5 mL of n-butyl lithium (2.65 M) was dropwise added thereto at −78° C., stirred at 25° C. for 3 hours, then the formed precipitate was separated through filtration and dried. The solid was suspended in 30 mL of toluene, and 1.4 g (6.0 mmol) of zirconium tetrachloride suspended in 15 mL of toluene was added thereto at −78° C., and stirred overnight at 25° C. to be a yellow suspension. The precipitate was separated through filtration, extracted with 60 mL of dichloromethane, filtered, and the solvent was evaporated to obtain 1.76 g of (1,2'-dimethylsilylene) (2,1'-dimethylsilylene)bis(3-trimethylsilylmethyl-5,6-dimethylindenyl)zirconium dichloride as a yellow solid (yield 40%).

The results in measurement through $^1$H-NMR (500 MHz, CDCl$_3$) were: δ −0.11 (s, Si(CH$_3$)$_3$, 18H); 0.88, 0.96 (s, Si(CH$_3$)$_2$, 12H); 2.24, 2.28 (s, —CH$_3$, 12H); 2.15, 2.53 (d, —CH$_2$—Si, 4H); 7.04, 7.09 (s, Ar—H, 4H).

Production Example 2

Synthesis of (1,2'-dimethylsilylen (2,1'-dimethylsilylene)-bis(3-cyclopentylmethyl-5,6-dimethylindenyl)zirconium dichloride [transition metal compound (a2) represented by the following formula]

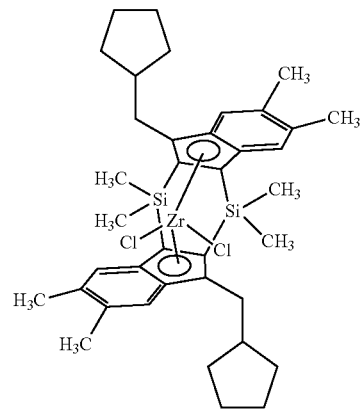

In the same manner as in Production Example 1 except that, in (1-5) in Production Example 1, bromomethylcyclopentane was added in place of methyltrimethylsilane iodide, (1,2'-dimethylsilylene) (2,1'-dimethylsilylene)bis(3-cyclopentylmethyl-5,6-dimethyl indenyl)zirconium dichloride was produced as a yellow solid (yield 22%).

The results in measurement through $^1$H-NMR (500 MHz, CDCl$_3$) were: δ 0.92, 1.02 (s, Si(CH$_3$)$_2$, 12H); 2.28, 2.30 (s, Ar—CH$_3$, 12H); 1.14, 1.47, 1.58, 1.85 (m, cyclopentyl, 18H); 2.53, 3.04 (m, —CH$_2$—, 4H); 7.08, 7.22 (s, Ar—H, 4H).

Production Example 3

Synthesis of (1,2'-dimethylsilylene) (2,1'-dimethylsilylene)-bis(3-triethylsilylmethylindenyl)zirconium dichloride [transition metal compound (a3)]

6.6 mL (52.7 mmol) of (chloromethyl)trichlorosilane and 100 mL of ether were put into a 300-mL three-neck flask, and an ether solution of 163.4 mmol of magnesium ethyl bromide was dropwise added thereto at room temperature via a dropping funnel. After the dropwise addition, this was heated under reflux for 7 hours. The reaction solution was hydrolyzed, processed for liquid-liquid separation, dried, and ether was evaporated away to obtain 5.9 g (35.8 mmol) of (chloromethyl)triethylsilane (yield 68%). This was dissolved in 100 mL of acetonitrile, 6.4 g of sodium iodide was added, and heated under reflux for 12 hours at 82° C. After cooled down to room temperature, this was diluted with ether, then filtered, and the solvent was evaporated away. The resultant residue was dissolved in hexane, filtered and concentrated to obtain 8.6 g (33.6 mmol) of (methyl iodide) triethylsilane (yield 94%).

5.5 g (16.0 mmol) of (1,2'-dimethylsilylene) (2,1'-dimethylsilylene)bis(indene) was put into a 200-mL Schlenk bottle, 100 mL of ether was added and cooled down to −20° C. 12.7 mL (33.7 mmol) of n-butyl lithium (hexane solution, 2.65 M) was dropwise added thereto, restored to room temperature and stirred for 4 hours. The resultant white precipitate was separated through filtration, and then dried to obtain a lithium salt. The solid was dissolved in 50 mL of THF, and cooled down to 0° C. 6.4 mL (33.6 mmol) of (methyl iodide) triethylsilane was gradually and dropwise added thereto, and stirred at room temperature for 12 hours. 50 mL of water was added for liquid-liquid separation, the organic phase was dried and the solvent was removed to obtain 9.1 g (15.2 mmol) of (1,2'-dimethylsilylene) (2,1'-dimethylsilylene)bis(3-triethylsilylmethylindene) (yield 95%).

Next, 9.1 g (15.2 mmol) of (1,2'-dimethylsilylene) (2,1'-dimethylsilylene)bis(3-triethylsilylmethylindene) and 80 mL of ether were put into a 200-mL Schlenk bottle. This was cooled down to −20° C., then 12.0 mL (31.8 mmol) of n-butyl lithium (hexane solution, 2.65 M) was added and stirred at room temperature for 4 hours. The resultant yellowish white solid was separated through filtration and dried to obtain a lithium salt (yield 73%).

In a nitrogen stream, the resultant lithium salt was dissolved in 70 mL of toluene. This was cooled down to 0° C., and a toluene (30 mL) suspension of 2.6 g (11.1 mmol) of zirconium tetrachloride previously cooled at 0° C. was added thereto. After the addition, this was stirred at room temperature for 6 hours. The solvent was evaporated away from the reaction solution, and the resultant yellowish brown residue was extracted with 200 mL of dichloromethane and recrystallized to obtain 2.2 g (2.9 mmol) of (1,2'-dimethylsilylene) (2,1'-dimethylsilylene)bis(3-triethylsilylmethylindenyl)-zirconium dichloride (yield 26%).

The results in measurement through $^1$H-NMR (500 MHz, CDCl$_3$) were: δ 0.38 (t, —CH$_3$, 18H); 0.76 (m, —CH$_2$—, 12H), 0.97, 0.90 (s, —Si(CH$_3$)$_3$, 12H), 2.55, 2.15 (d, —CH$_2$—Si, 4H), 7.07, 7.16, 7.27, 7.35 (Ar—H, 8H).

Production Example 4

Synthesis of (1,2'-dimethylsilylene) (2,1'-dimethylsilylene)-bis(3-cyclopropylmethylindenyl)zirconium dichloride [transition metal compound (a4)]

In the same manner as in Production Example 3 except that, in Production Example 3, bromomethylcyclopropane was added in place of (methyl iodide) triethylsilane, (1,2'-dimethylsilylene) (2,1'-dimethylsilylene)bis(3-cyclopropylmethylindenyl)-zirconium dichloride was produced as a yellow solid (yield 31%).

The results in measurement through $^1$H-NMR (500 MHz, CDCl$_3$) were: δ 0.02, 0.17, 0.35, 0.41, 0.83 (m, -cyclopropyl, 10H), 0.94, 1.09 (s, =Si(CH$_3$)$_2$, 12H), 2.55, 3.04 (dd, —CH$_2$—, 4H), 7.16, 7.24, 7.33, 7.51 (Ar—H, 8H).

Production Example 5

Synthesis of (1,2'-dimethylsilylene)(2,1'-dimethylsilylene)bis(indenyl)zirconium dichloride [transition metal compound (a5)]

According to the method described in Example 1 in JP-A 2000-256411, (1,2'-dimethylsilylene) (2,1'-dimethylsilylene)bis(indenyl)zirconium dichloride was produced.

The results in measurement through $^1$H-NMR (500 MHz, CDCl$_3$) were: δ 0.84, 1.07 (s, —Si(CH$_3$)$_3$, 12H), 7.11 (s, —CH—, 2H), 7.21, 7.31, 7.66 (Ar—H, 8H).

Production Example 6

Synthesis of (1,2'-dimethylsilylene) (2,1'-dimethylsilylene)-bis(3-trimethylsilylmethylindenyl)zirconium dichloride [transition metal compound (a6)]

According to the method described in Example 9 in JP-A 2000-256411, (1,2'-dimethylsilylene) (2,1'-dimethylsilylene)bis(3-trimethylsilylmethylindenyl)-zirconium dichloride was produced.

Production Example 7

(Production of polypropylene (A-1))

400 mL of heptane, 0.5 mmol of triisobutyl aluminum, 2.0 μmol of N,N-dimethylanilinium tetrakis(pentafluorophenyl) borate, and 0.5 μmol of the transition metal compound (a1) were put into a heated and dried 1-L autoclave, and further 0.05 MPa of hydrogen was introduced thereinto, and propylene was introduced to make the total pressure 0.7 MPa and polymerized at 80° C. for 30 minutes. After the polymerization reaction, the reaction product was dried under reduced pressure to obtain 76 g of a polypropylene (A-1).

Production Example 8

(Production of polypropylene (A-2)

124 g of a polypropylene (A-2) was produced in the same manner as in Production Example 7, except that the transition metal compound (a2) was used in place of the transition metal compound (a1) and the polymerization temperature was changed to 70° C.

Production Example 9

(Production of Polypropylene (A-3)

182 g of a polypropylene (A-3) was produced in the same manner as in Production Example 8, except that the transition metal compound (a3) was used in place of the transition metal compound (a2), the total pressure was changed to 0.55 MPa and the polymerization temperature was changed to 75° C.

Production Example 10

(Production of polypropylene (A-4)

400 mL of heptane, 0.5 mmol of triisobutyl aluminum, 0.8 μmol of N,N-dimethylanilinium tetrakis(pentafluorophenyl) borate, and 0.2 μmol of the transition metal compound (a6) were put into a heated and dried 1-L autoclave, and further 0.02 MPa of hydrogen was introduced thereinto, and propylene was introduced to make the total pressure 0.8 MPa and polymerized at 70° C. for 30 minutes. After the polymerization reaction, the reaction product was dried under reduced pressure to obtain 120 g of a polypropylene (A-4).

Production Example 11

(Production of polypropylene (A-5)

20 L/hr of n-heptane, 15 mmol/hr of triisobutyl aluminum, and further a catalyst component prepared by previous contact of dimethylanilinium tetrakispentafluorophenyl borate, the transition metal compound (a6) and triisobutyl aluminum in a ratio by weight of 1/2/20 with propylene, in a zirconium-equivalent amount of 6 μmol/hr were continuously fed into a stainless reactor having an inner volume of 20 L and equipped with a stirrer.

Propylene and hydrogen were continuously fed into the reactor so as to keep the total pressure inside the reactor at 1.0 MPa·G, in which the polymerization temperature was 75° C. and the hydrogen concentration in the vapor phase was 24 mol %. An antioxidant was added to the resultant polymerization solution so that the content thereof could be 1000 ppm by mass, and then the solvent n-heptane was removed to obtain a polypropylene (A-5).

Production Example 12

(Production of polypropylene (A-6)

20 L/hr of n-heptane, 15 mmol/hr of triisobutyl aluminum, and further a catalyst component prepared by previous contact of dimethylanilinium tetrakispentafluorophenyl borate, the transition metal compound (a6) and triisobutyl aluminum in a ratio by weight of 1/2/20 with propylene, in a zirconium-equivalent amount of 6 mol/hr were continuously fed into a stainless reactor having an inner volume of 20 L and equipped with a stirrer.

Propylene and hydrogen were continuously fed into the reactor so as to keep the total pressure inside the reactor at 1.0 MPa·G, in which the polymerization temperature was 70° C. and the hydrogen concentration in the vapor phase was 15 mol %. An antioxidant was added to the resultant polymerization solution so that the content thereof could be 1000 ppm by mass, and then the solvent n-heptane was removed to obtain a polypropylene (A-6).

Production Example 13

(Production of polypropylene (B-1)

70 g of a polypropylene (B-1) was produced in the same manner as in Production Example 8 except that, in Production Example 8, the transition metal compound (a4) was used in place of the transition metal compound (a2) and the polymerization temperature was changed to 75° C.

Production Example 14

(Production of polypropylene (B-2)

92 g of a polypropylene (B-2) was produced in the same manner as in Production Example 8 except that, in Production Example 8, the transition metal compound (a5) was used in place of the transition metal compound (a2), the hydrogen pressure was changed to 0.01 MPa and the total pressure was changed to 0.80 MPa.

In the following Examples, the following raw materials were used.
Polypropylene (B-3):
  Homopolypropylene [manufactured by Primer Polymer Co., Ltd., Prime Polypro (trade name), "H50000" (grade level)]
Polypropylene (B-4):
  Maleic anhydride-modified polypropylene [manufactured by Clariant International Ltd., "Licocene PP" (trade name), "MA7452" (grade level), ethylene content: 1.1 mol %]
  The ethylene content in the polypropylene (B-4) was determined through NMR to be mentioned below.
Polypropylene (B-5):
  Homopolypropylene [manufactured by Primer Polymer Co., Ltd., Y2005GP (trade name)]
Polypropylene (B-6):
  Homopolypropylene [manufactured by Primer Polymer Co., Ltd., Y2045GP (trade name)]

The ethylene content in the homopolypropylene (B-6) was determined through NMR to be mentioned below.
Polypropylene (B-7):
  Homopolypropylene [manufactured by Clariant International Ltd., "Licocene PP" (trade name), "PP7502" (grade level)]
Oil (D-1):
  High-viscosity oil [manufactured by Idemitsu Kosan Co., Ltd., PW380 (trade name), kinematic viscosity: 380 cSt (40° C.)]
  The kinematic viscosity was measured according to ISO3104.
(Ethylene Content)
  $^{13}$C-NMR spectrometry was carried out using the apparatus shown below under the condition also shown below. The peak attribution conforms to the method proposed by H. N. Cheng in "Macromolecules, 17, 1950 (1984)".
Apparatus: manufactured by Bruker BioSpin Corporation, "AVANCE III HD"
Probe: BBO, corresponding to 10-mmφ sample tube.
Method: proton complete decoupling method
Concentration: 220 mg/mL
Solvent: mixed solvent of 1,2,4-trichlorobenzene and heavy benzene at 95/5 (by volume)
Temperature: 130° C.
Pulse width: 45°
Pulse repetition time: 4 sec
Cumulative number: 500 times
<Calculation Process>
  Symbols such as $T_{\delta\delta}$ conform to the expression by C. J. Carman, et al. in "Macromolecules, 10, 536 (1977)"; and S represents a methylene carbon, and T represents a methine carbon.
A: integrated value of $T_{\delta\delta}$ observed at around 33.3 ppm.
B: integrated value of $T_{\beta\delta}$ observed at around 31.0 ppm.
C: integrated value of $S_{\gamma\delta}$ observed at around 30.4 ppm.
D: integrated value of $S_{\delta\delta}$ observed at around 30.0 ppm.
E: integrated value of $T_{\beta\beta}$ observed at around 28.9 ppm.
F: integrated value of $S_{\beta\delta}$ observed at around 27.3 ppm.
G: integrated value of $S_{\beta\beta}$ observed at around 24.8 ppm.
  Here, a triad fraction (mol %) is determined according to the following equations.

$$[EPE]=A/T\times 100$$

$$[PPE]=B/T\times 100$$

$$[EEE]=(C/4+D/2)/T\times 100$$

$$[PPP]=E/T\times 100$$

$$[PEE]=F/T\times 100$$

$$[PEP]=G/T\times 100$$

$$T=[EPE]+[PPE]+[EEE]+[PPP]+[PEE]+[PEP]$$

Using the triad fraction, the ethylene content (mol %) is calculated according to the following equations.

$$a=([EPE]+[PEE])\times 2/3+([PPE]+[PEP])/3+[EEE]$$

$$b=([EPE]+[PEE])/3+([PPE]+[PEP])\times 2/3+[PPP]$$

$$TW=a\times 28+b\times 42$$

Ethylene content(mol %)=$a\times 28/TW\times 100$

The polypropylenes (A-1) to (A-6) and (B-1) to (B-7) were measured regarding the above. The results are shown in Table 1-1 and Table 1-2.

TABLE 1-1

|  | Unit | A-1 Production Example 7 | A-2 Production Example 8 | A-3 Production Example 9 | A-4 Production Example 10 | A-5 Production Example 11 | A-6 Production Example 12 |
|---|---|---|---|---|---|---|---|
| Melting Endotherm ΔH-D | J/g | 16.5 | 22.5 | 35.5 | 36.1 | 36 | 38 |
| Melting Point Tm-D | °C. | 48.2 | 48.7 | 48.3 | 77.8 | 80 | 80 |
| [mm] | mol % | 52.2 | 62.3 | 64.3 | 69.3 | 67.8 | 64.6 |
| [mmmm] | mol % | 33.2 | 38.8 | 43.5 | 48.1 | 45.9 | 49.6 |
| [rrrr]/(100 − [mmmm]) | — | 0.14 | 0.03 | 0.04 | 0.04 | 0.039 | 0.038 |
| [mm] × [rr]/[mr]$^2$ | — | 1.0 | 1.3 | 1.4 | 1.4 | 1.4 | 1.6 |
| [mmmm]/([mmr] + [rmmr]) | — | 1.6 | 2.1 | 1.5 | 2.5 | — | — |
| Limiting Viscosity [η] | dL/g | 0.53 | 0.52 | 0.39 | 1.2 | 0.51 | 0.78 |
| Weight-Average Molecular Weight Mw | — | 51,800 | 49,700 | 44,500 | 112,000 | 45,000 | 75,000 |
| Molecular Weight Distribution Mw/Mn | — | 1.8 | 1.9 | 1.9 | 2.0 | 2.0 | 2.0 |
| Semi-Crystallization Time | min | 120 | 90 | 23 | 27 | 12.1 | 13.4 |
| Acid Value | mgKOH/g | 0 | 0 | 0 | 0 | 0 | 0 |
| Ethylene Content | mol % | 0 | 0 | 0 | 0 | 0 | 0 |

TABLE 1-2

|  | Unit | B-1 Production Example 13 | B-2 Production Example 14 | B-3 Commercial Product | B-4 Commercial Product | B-5 Commercial Product | B-6 Commercial Product | B-7 Commercial Product |
|---|---|---|---|---|---|---|---|---|
| Melting Endotherm ΔH-D | J/g | 62.2 | 76.2 | 118.3 | 84.4 | 161 | 65 | 107 |
| Melting Point Tm-D | °C. | 99.6 | 121.6 | 164.3 | 154.1 | 100 | 132 | 152 |
| [mm] | mol % | 75.5 | 82.4 | 98.8 | 93.7 | 96.3 | 86.2 | 97.2 |
| [mmmm] | mol % | 58.7 | 69.9 | 97.7 | 93.3 | 93.5 | — | — |
| [rrrr]/(100 − [mmmm]) | — | 0.02 | 0.01 | — | — | 0.065 | 0.004 | — |
| [mm] × [rr]/[mr]$^2$ | — | 2.5 | 2.8 | — | — | 29 | 0.77 | — |
| [mmmm]/([mmr] + [rmmr]) | — | 4.3 | 9.1 | — | — | — | — | — |
| Limiting Viscosity [η] | dL/g | 0.48 | 0.53 | 0.66 | 0.23 | — | — | 0.38 |
| MFR | g/10 min | — | — | 500 | — | 20 | 20 | — |
| Weight-Average Molecular Weight Mw | — | 47,600 | 50,600 | — | — | 234,200 | 175,300 | 31,800 |
| Molecular Weight Distribution Mw/Mn | — | 1.9 | 1.9 | — | — | 5.3 | 4.0 | 2.1 |
| Semi-Crystallization Time | min | <1 | <1 | <1 | <1 | <1 | <1 | <1 |
| Acid Value | mgKOH/g | 0 | 0 | 0 | 64 | 0 | 0 | 0 |
| Ethylene Content | mol % | 0 | 0 | 0 | 1.1 | 0 | 2.1 | 0 |

Example 1

99% by mass of the polypropylene (A-4) and 1% by mass of the polypropylene (B-6) were kneaded in "LABO PLASTOMILL 50MR" manufactured by Toyo Seiki Seisaku-sho, Ltd., at 200° C. for 5 minutes to obtain a resin composition.

Examples 2 to 8, and Comparative Examples 1 to 4

Resin compositions were produced in the same manner as in Example 1 except that, in Example 1, the kind and the blending amount of each component were changed to those in Table 2.

The resin compositions obtained in these Examples were evaluated in point of the following. The results are shown in Table 2.

(Meso triad fraction [mm] of resin composition)

In the same manner as that for the measurement of resin, the above-mentioned NMR measurement was carried out.

(Weight-average molecular weight (Mw) and molecular weight distribution (Mw/Mn) of resin composition)

In the same manner as that for the measurement of resin, the above-mentioned GPC measurement was carried out.

(Melting Endotherm (ΔH-D) of Resin Composition)

In the same manner as that for the measurement of resin, the above-mentioned DSC measurement was carried out.

(Semi-Crystallization Time of Resin Composition)

In the same manner as that for the measurement of resin, the above-mentioned measurement was carried out.

(Acid Value of Resin Composition)

In the same manner as that for the measurement of resin, the measurement was carried out based on JIS K2501:2003.

<Solidification Speed>

Using a rheometer (manufactured by Anton-PAAR Corporation, MCR301 (product name or model code)), a sample of the resin composition was cooled from 150° C. down to 25° C. at $(141 \times e^{-0.002 \times lapse\ time})°$ C./min, and then kept at 25° C. In the process, the time at which cooling was begun is referred to as 0 second, and the time at which the viscosity exceeded 150,000 Pa-s is defined as a solidification time.

<Softening Point>

Measured according to a ring and ball method according to JAI 7-1991.

<Viscosity>

Measured under the condition of 190° C. using a B-type viscometer according to JIS Z 8803(2011).

<Calculation of Formula (F)>

The formula (F) was calculated by substituting the meso triad fraction [mm] (unit: mol %) of the polypropylene-based resin (A), the mass ratio of the polypropylene-based resin (A) relative to the total mass of the polypropylene-based resin (A) and the polypropylene-based resin (B), the meso triad fraction [mm] (unit: mol %) of the polypropylene-based resin (B), and the mass ratio of the polypropylene-based resin (B) relative to the total mass of the polypropylene-based resin (A) and the polypropylene-based resin (B) thereinto.

<Stickiness>

Using a press-molding machine (200° C.), a plate of 150 mm×150 mm×1 mm of press-molded, then left at room temperature (25° C.) for 1 day, and the surface of the molded plate was checked by touch with fingers for the presence or absence of stickiness.

TABLE 2

| | | Unit | Example 1 | Example 2 | Example 3 | Example 4 | Example 5 | Example 6 |
|---|---|---|---|---|---|---|---|---|
| Polypropylene based Resin (A) | Polypropylene (A-4) | mass % | 99 | 95 | 95 | 99 | | |
| | Polypropylene (A-5) | mass % | | | | | | 99 |
| | Polypropylene (A-6) | mass % | | | | | 89 | |
| Polypropylene based Resin (B) | Polypropylene (B-5) | mass % | | | 5 | 1 | 1 | |
| | Polypropylene (B-6) | mass % | 1 | 5 | | | | 1 |
| | Polypropylene (B-7) | mass % | | | | | | |
| Oil (D) | Oil (D-1) | mass % | | | | | 10 | |
| [mm] | | mol % | 72.6 | 73.4 | 73.4 | 72.5 | 71.9 | 69.7 |
| Ethylene Content | | mol % | 0.0 | 0.0 | 0.11 | 0.0 | 0.0 | 0.0 |
| Acid Value | | mgKOH/g | 0.0 | 0.0 | 0.0 | 0.0 | 0.0 | 0.0 |
| Semi-crystallization Time | | min | | | | | | |
| Weight-Average Molecular Weight Mw | | — | | | | | | |
| Molecular Weight Distribution Mw/Mn | | — | | | | | | |
| Melting Endotherm ΔH-D | | J/g | 39 | 43 | 41 | 40 | 31 | 38 |
| Solidification Speed | | sec | 480 | 400 | 400 | 430 | 900 | 530 |
| Softening Point | | ° C. | 121.0 | 162.0 | 134.0 | 134.0 | 106.0 | 98.5 |
| Viscosity (190° C.) | | mPa · s | 420,000 | 450,000 | 450,000 | 420,000 | 50 | 7,800 |
| Formula (F) | | | 143 | 530 | 437 | 161 | 157 | 143 |
| Stickiness | | — | no | no | no | no | no | no |

| | | Unit | Example 7 | Example 8 | Comparative Example 1 | Comparative Example 2 | Comparative Example 3 | Comparative Example 4 |
|---|---|---|---|---|---|---|---|---|
| Polypropylene based Resin (A) | Polypropylene (A-4) | mass % | | | | 100 | | |
| | Polypropylene (A-5) | mass % | 99 | 97 | 100 | | | |
| | Polypropylene (A-6) | mass % | | | | | | |
| Polypropylene based Resin (B) | Polypropylene (B-5) | mass % | | | | | 100 | |
| | Polypropylene (B-6) | mass % | | 3 | | | | 100 |
| | Polypropylene (B-7) | mass % | 1 | | | | | |
| Oil (D) | Oil (D-1) | mass % | | | | | | |
| [mm] | | mol % | 69.8 | 70.0 | 69.5 | 72.3 | 93.8 | 97.7 |
| Ethylene Content | | mol % | 0.0 | 0.1 | 0.0 | 0.0 | 0.0 | 2.1 |
| Acid Value | | mgKOH/g | 0.0 | 0.0 | 0.0 | 0.0 | 0.0 | 0.0 |
| Semi-crystallization Time | | min | | | | | | |
| Weight-Average Molecular Weight Mw | | — | | | 45,000 | 130,000 | 234,200 | 175,600 |
| Molecular Weight Distribution Mw/Mn | | — | | | 2.0 | 2.0 | 5.3 | 4.0 |
| Melting Endotherm ΔH-D | | J/g | 38 | 40 | 36 | 37 | 100 | 65 |
| Solidification Speed | | sec | 800 | 450 | 2,300 | 750 | 1> | 1> |
| Softening Point | | ° C. | 94.5 | 119.5 | 90.0 | 120.0 | 160< | 160< |
| Viscosity (190° C.) | | mPa · s | 7,900 | 8,000 | 8,200 | 400,000 | 500,000< | 500,000< |
| Formula (F) | | | 163 | 290 | 70 | 69 | 9274 | 7430 |
| Stickiness | | — | no | no | no | no | no | no |

The polypropylene-based resin compositions of the present invention had a solidification speed of 200 to 2,000 sec and a softening point of 90 to 165° C., which are those well controlled to fall within the respective desired ranges.

Example 9

33.25 g of the polypropylene (A-1) and 1.75 g of the polypropylene (B-2) were kneaded in "LABO PLASTO-MILL 50MR" manufactured by Toyo Seiki Seisaku-sho, Ltd., at 200° C. for 5 minutes to obtain a resin composition.

The resultant resin composition was pelletized into pellets, using an extruder (manufactured by Toshiba Machine Co., Ltd., "TEM-2655", resin temperature: 100° C., the outlet port temperature: 90° C.) and an underwater cutter system (water temperature 20° C.) arranged at the die outlet port.

Examples 10 to 17, Comparative Examples 5 to 7, and Reference Examples 1, 3 to 6

Pellets were produced in the same manner as in Example 9 except that, in Example 9, the kind and the amount of the polypropylene were changed as in Table 3.

Reference Example 2

29.7 g of the polypropylene (A-4), 0.3 g of the polypropylene (B-3) and 20 mL of toluene bubbled with nitrogen were put into a 0.5-L separable flask equipped with a nitrogen introducing tube, a Dimroth tube and a stirring unit, and heated with an oil bath at 140° C. in a nitrogen atmosphere to obtain a viscous uniform solution. Subsequently, 0.3 g of maleic anhydride was added and dissolved therein, then 0.15 g of "Perhexa 25B" (manufactured by NOF corporation) was put thereinto, the oil bath was heated up to 150° C., and then this was stirred for 5 hours. The resultant reaction product was dried by heating under reduced pressure to obtain a resin composition. The resultant resin composition was pelletized into pellets in the same manner as in Example 9.

The pellets obtained in these Examples were evaluated as follows. The results are shown in Table 3.
(Meso Pentad Fraction [mmmm] and Meso Triad Fraction [mm] of Resin Composition)
In the same manner as that for the measurement of resin, the above-mentioned NMR measurement was carried out.
(Weight-Average Molecular Weight (Mw) and Molecular Weight Distribution (Mw/Mn) of Resin Composition)
In the same manner as that for the measurement of resin, the above-mentioned GPC measurement was carried out.
(Melting Endotherm (ΔH-D) of Resin Composition)
In the same manner as that for the measurement of resin, the above-mentioned DSC measurement was carried out.
(Semi-Crystallization Time of Resin Composition)
In the same manner as that for the measurement of resin, the above-mentioned measurement was carried out.
(Acid Value of Resin Composition)
In the same manner as that for the measurement of resin, the measurement was carried out based on JIS K2501:2003.
<Hardness>
One day after the production, the Shore D hardness of the pellets was measured using a hardness meter (manufactured by Nishi-Tokyo Seimitsu Co., Ltd., "WR-205D").
<Granulability (Solidification Speed)>
An aluminum plate and further a Teflon sheet ("Teflon" is a registered trademark) were put on an iron plate, and a mold with a hole of 40 mm×40 mm×6 mm formed in the center part of 60 mm×60 mm×6 mm was laid thereon. About 7 g of a sample was filled into the hole of the mold, and further a Teflon sheet and an aluminum plate were laid thereon, and using a pressing machine, this was hot-melted at 200° C. under a pressure of about 1 MPa for 4 minutes. After the heating, the mold kept sandwiched between the Teflon sheets was drawn out, and put into 1 L of water with ice as such and cooled therein. After 1 minute, this was taken out of water with ice, the Teflon sheets were removed, and the time at which the mold was taken out of water with ice was referred to as 0 minute, the relationship between the lapse time and the Shore A hardness of the sample was investigated using a hardness meter "WR-104A" (manufactured by Nishi-Tokyo Seimitsu Co., Ltd.). The sample was evaluated according to the following evaluation criteria.
A: The Shore A hardness after 5 minutes is 25 or more.
B: The Shore A hardness after 5 minutes is less than 25.
<Flexibility (Tensile Modulus)>
From the press sheet, a ½ test piece of JIS K7113-2, No. 2 was sampled. Using a tensile tester (manufactured by Shimadzu Corporation, product name: "Autograph AG-I"), the test piece was tested in a tensile test at a tension rate of 100 mm/min, in an environment at 23° C. and a humidity of 50% to determine the tensile modulus thereof. In the present invention, samples having a tensile modulus of 80 MPa or less are good.
<Calculation of Formula (F)>
The formula (F) was calculated by substituting the meso triad fraction [mm] (unit: mol %) of the polypropylene-based resin (A), the mass ratio of the polypropylene-based resin (A) relative to the total mass of the polypropylene-based resin (A) and the polypropylene-based resin (B), the meso triad fraction [mm] (unit: mol %) of the polypropylene-based resin (B), and the mass ratio of the polypropylene-based resin (B) relative to the total mass of the polypropylene-based resin (A) and the polypropylene-based resin (B) thereinto.

TABLE 3

| | | | Comparative Example 5 | Example 9 | Exampe 10 | Example 11 | Comparative Example 6 | Example 12 | Example 13 | Example 14 | Example 15 |
|---|---|---|---|---|---|---|---|---|---|---|---|
| Polypropylene-based Resin (A) | Polypropylene (A-1) | mass % | 100 | 95 | 90 | 80 | — | — | — | — | — |
| | Polypropylene (A-2) | mass % | — | — | — | — | 100 | 95 | 90 | 95 | 90 |
| | Polypropylene (A-3) | mass % | — | — | — | — | — | — | — | — | — |
| | Polypropylene (A-4) | mass % | — | — | — | — | — | — | — | — | — |

TABLE 3-continued

| | | | | | | | | | | | |
|---|---|---|---|---|---|---|---|---|---|---|---|
| Poly-propylene-based Resin (B) | Polypropylene (B-1) | mass % | — | — | — | — | — | — | — | — | — |
| | Polypropylene (B-2) | mass % | — | 5 | 10 | 20 | — | 5 | 10 | — | — |
| | Polypropylene (B-3) | mass % | — | — | — | — | — | — | — | 5 | 10 |
| | Polypropylene (B-4) | mass % | — | — | — | — | — | — | — | — | — |
| [mmmm] | | mol % | 33.2 | 34.1 | 35.9 | 39.8 | 38.8 | 40.5 | 42.1 | 41.7 | 44.3 |
| [mm] | | mol % | 52.2 | 59.8 | 62.3 | 64.6 | 62.3 | 65.2 | 66.3 | 64.6 | 66.6 |
| Acid Value | | mgKOH/g | 0 | 0 | 0 | 0 | 0 | 0 | 0 | 0 | 0 |
| Semi-crystallization Time | | min | 120 | 14 | 8 | 4 | 90 | 9 | 6 | <1 | <1 |
| Weight-Average Molecular Weight Mw | | — | 51,800 | 51,400 | 51,000 | 51,900 | 49,700 | 56,100 | 55,500 | 69,500 | 68,400 |
| Molecular Weight Distribution Mw/Mn | | — | 1.8 | 1.8 | 1.9 | 1.8 | 1.9 | 1.9 | 1.9 | 1.9 | 2.0 |
| Melting Endotherm ΔH-D | | J/g | — | 18 | 19 | 24 | — | 29 | 31 | 17 | 20 |
| Shore D Hardness after 1 day | | — | 10 | 18 | 23 | 30 | 10 | 30 | 42 | 33 | 44 |
| Shore A Hardness after 5 minutes | | — | 15 | 30 | 30 | 55 | 18 | 31 | 40 | 60 | 70 |
| Evaluation of Granulability | | — | B | A | A | A | B | A | A | A | A |
| Tensile Modulus | | MPa | 9.6 | 15 | 19 | 33 | 24 | 56 | 68 | 32 | 39 |
| Formula (F) | | | 52 | 389 | 726 | 1400 | 62 | 399 | 735 | 547 | 1032 |

| | | | Example 16 | Comparative Example 7 | Example 17 | Reference Example 1 | Reference Example 2 | Reference Example 3 | Reference Example 4 | Reference Example 5 | Reference Example 6 |
|---|---|---|---|---|---|---|---|---|---|---|---|
| Poly-propylene-based Resin (A) | Polypropylene (A-1) | mass % | — | — | — | — | — | — | — | — | — |
| | Polypropylene (A-2) | mass % | 95 | — | — | — | — | — | — | 80 | 80 |
| | Polypropylene (A-3) | mass % | — | 100 | 95 | — | — | — | — | — | — |
| | Polypropylene (A-4) | mass % | — | — | — | 100 | 99 | — | — | — | — |
| Poly-propylene-based Resin (B) | Polypropylene (B-1) | mass % | — | — | 5 | — | — | 100 | — | — | — |
| | Polypropylene (B-2) | mass % | — | — | — | — | — | — | 100 | 20 | — |
| | Polypropylene (B-3) | mass % | — | — | — | — | 1 | — | — | — | 20 |
| | Polypropylene (B-4) | mass % | 5 | — | — | — | — | — | — | — | — |
| [mmmm] | | mol % | 41.5 | 43.5 | 44.4 | 48.1 | 39.4 | 58.7 | 69.9 | 45.2 | 50.6 |
| [mm] | | mol % | 63.9 | 64.3 | 64.2 | 69.3 | 62.8 | 75.5 | 82.4 | 69.5 | 71.1 |
| Acid Value | | mgKOH/g | 3 | 0 | 0 | 0 | 11 | 0 | 0 | 0 | 0 |
| Semi-crystallization Time | | min | <1 | 23 | 3 | 27 | 6 | <1 | <1 | 3 | <1 |
| Weight-Average Molecular Weight Mw | | — | 66,800 | 44,500 | 49,300 | 112,000 | 78,600 | 47,600 | 50,600 | 55,400 | 66,200 |
| Molecular Weight Distribution Mw/Mn | | — | 2.1 | 1.9 | 1.9 | 2 | 2.5 | 1.9 | 1.9 | 1.9 | 2.0 |
| Melting Endotherm ΔH-D | | J/g | 26 | — | 25 | — | — | — | — | 36 | 30 |
| Shore D Hardness after 1 day | | — | 32 | — | 20 | 40 | 35 | — | — | 45 | 45 |
| Shore A Hardness after 5 minutes | | — | 55 | 20 | 30 | 45 | 50 | 90< | 90< | 65 | 70 |
| Evaluation of Granulability | | — | A | B | A | A | A | A | A | A | A |
| Tensile Modulus | | MPa | 30 | 86 | 79 | 150 | 150 | 450 | 680 | 87 | 85 |
| Formula (F) | | | 498 | 64 | 346 | 69 | 166 | 5700 | 6790 | 1408 | 2002 |

Pellets containing the polypropylene-based resin composition of the present invention are excellent in flexibility and granulability. On the other hand, in Comparative Examples 5 to 7 where a resin composition not containing the polypropylene-based resin (B) was used, pellets capable expressing sufficient granulability could not be produced. In addition, in the case where the value of the formula (F) is less than 80 or more than 1400, pellets capable of expressing sufficient flexibility and granulability could not be produced.

The invention claimed is:

1. A polypropylene-based resin composition comprising:
    a polypropylene-based resin (A) which has a melting endothelin (ΔH-D) of 2 J/g or more and 40 Jig or less and wherein the polypropylene-based resin (A) has a melting point (Tm-D) of 30° C. or higher and lower than 90° C., and
    a polypropylene-based resin (B) which has a melting endotherm (ΔH-D) of more than 40 J/g and 125 J/g or less,
    wherein the polypropylene-based resin (A) is present in an amount of 70% by mass or more and 99.5% by mass or less and the polypropylene-based resin (B) in an amount of 0.5% by mass or more and 30% by mass or less.

2. The polypropylene-based resin composition according to claim 1, wherein the meso triad fraction [mm] of the polypropylene-based resin (A) is 20 mol % or more and 80 mol % or less.

3. The polypropylene-based resin composition according to claim 1, wherein the meso pentad fraction [mmmm] of the polypropylene-based resin (A) is 1 mol % or more and 55 mol % or less.

4. The polypropylene-based resin composition according to claim 1, wherein the limiting viscosity [η] of the polypropylene-based resin (A) is 0.01 dL/g or more and 2.5 dL/g or less.

5. The polypropylene-based resin composition according to claim 1, wherein the polypropylene-based resin (A) comprises at least one structural unit selected from the group consisting of ethylene and an α-olefin having 4 to 30 carbon atoms, in an amount of more than 0 mol % and 20 mol % or less.

6. The polypropylene-based resin composition according to claim 1, wherein the melting point (Tm-D) of the polypropylene-based resin (B) is 90° C. or higher and 180° C. or lower.

7. The polypropylene-based resin composition according to claim 1, wherein the meso triad fraction [mm] of the polypropylene-based resin (B) is 70 mol % or more and 99.5 mol % or less.

8. The polypropylene-based resin composition according to claim 1, wherein the meso pentad fraction [mmmm] of the polypropylene-based resin (B) is 55 mol % or more and 99.5 mol % or less.

9. The polypropylene-based resin composition according to claim 1, wherein the limiting viscosity [η] of the polypropylene-based resin (B) is 0.01 dL/g or more and 2.5 dL/g or less.

10. The polypropylene-based resin composition according to claim 1, wherein the polypropylene-based resin (B) comprises at least one structural unit selected from the group consisting of ethylene and an α-olefin having 4 to 30 carbon atoms, in an amount of more than 0 mol % and 15 mol % or less.

11. The polypropylene-based resin composition according to claim 1, wherein the Mw of the polypropylene-based resin (B) is 500,000 or less.

12. The polypropylene-based resin composition according to claim 1, wherein the acid value of the polypropylene-based resin (A) and/or the polypropylene-based resin (B) is 10 mgKOH/g or more and 250 mgKOH/g or less.

13. The polypropylene-based resin composition according to claim 1, satisfying the following formula (F):

$$80 \leq mmA \times rA + mmB^2 \times rB \leq 1400 \quad (F)$$

wherein mmA represents a meso triad fraction [mm] (unit: mol %) of the polypropylene-based resin (A), rA represents a mass ratio of the polypropylene-based resin (A) relative to the total mass of the polypropylene-based resin (A) and the polypropylene-based resin (B), mmB represents a meso triad fraction [mm] (unit: mol %) of the polypropylene-based resin (B), rB represents a mass ratio of the polypropylene-based resin (B) relative to the total mass of the polypropylene-based resin (A) and the polypropylene-based resin (B).

14. The polypropylene-based resin composition according to claim 1, further comprising a petroleum resin (C).

15. The polypropylene-based resin composition according to claim 1, further comprising an oil (D).

16. The polypropylene-based resin composition according to claim 15, wherein the kinetic viscosity at 40° C. of the oil (D) is 5 cSt or more and 800 cSt or less.

17. The polypropylene-based resin composition according to claim 15, wherein the oil (D) is at least one selected from the group consisting of a mineral oil-based hydrocarbon, a paraffin-based process oil, and a naphthene-based process oil.

18. The polypropylene-based resin composition according to claim 1, having a semi-crystallization time of 30 minutes or less.

19. The polypropylene-based resin composition according to claim 1, having a melting endotherm (ΔH-D) of 1 J/g or more and 60 J/g or less.

* * * * *